(12) United States Patent
Bryant, Jr.

(10) Patent No.: US 12,435,636 B1
(45) Date of Patent: Oct. 7, 2025

(54) COMPOSITE AIRFOIL FOR A TURBINE ENGINE

(71) Applicant: General Electric Company, Schenectady, NY (US)

(72) Inventor: Gary Willard Bryant, Jr., Loveland, OH (US)

(73) Assignee: General Electric Company, Evendale, OH (US)

(*) Notice: Subject to any disclaimer, the term of this patent is extended or adjusted under 35 U.S.C. 154(b) by 0 days.

(21) Appl. No.: 18/672,367

(22) Filed: May 23, 2024

(51) Int. Cl.
*F01D 5/28* (2006.01)

(52) U.S. Cl.
CPC ........ *F01D 5/282* (2013.01); *F05D 2300/603* (2013.01)

(58) Field of Classification Search
CPC ........................... F01D 5/282; F05D 2300/614
See application file for complete search history.

(56) References Cited

U.S. PATENT DOCUMENTS

| | | | |
|---|---|---|---|
| 3,762,835 A | 10/1973 | Farmer | |
| 4,006,999 A | 2/1977 | Brantley | |
| 5,392,514 A | 2/1995 | Cook et al. | |
| 5,785,498 A | 7/1998 | Quinn et al. | |
| 7,066,717 B2 | 6/2006 | Morrison et al. | |
| 8,647,070 B2 | 2/2014 | Jevons | |
| 8,967,961 B2 | 3/2015 | McCaffrey | |
| 9,957,821 B2 * | 5/2018 | Duelm | F01D 5/28 |
| 10,233,761 B2 | 3/2019 | Snider et al. | |
| 10,301,946 B2 | 5/2019 | Weber et al. | |
| 10,471,556 B2 | 11/2019 | Onfray et al. | |
| 10,906,267 B2 * | 2/2021 | Amat | B32B 1/08 |
| 11,105,210 B2 * | 8/2021 | Gimat | F01D 5/282 |
| 11,473,430 B2 | 10/2022 | Foresto et al. | |
| 11,946,391 B2 * | 4/2024 | Gunasekera | F01D 5/282 |
| 2015/0377046 A1 * | 12/2015 | Duelm | F01D 5/284 156/189 |
| 2016/0230569 A1 | 8/2016 | Duelm et al. | |
| 2021/0324751 A1 | 10/2021 | Theertham | |
| 2022/0290572 A1 * | 9/2022 | Gunasekera | F01D 25/005 |

* cited by examiner

*Primary Examiner* — J. Todd Newton
(74) *Attorney, Agent, or Firm* — McGarry Bair PC

(57) ABSTRACT

A composite airfoil for a turbine engine, the composite airfoil having at least one airfoil body element. The at least one airfoil body element includes a core and a composite wrap, where the composite wrap overlies at least a portion of the core. The core includes a set of composite plies.

20 Claims, 12 Drawing Sheets

COMPOSITE AIRFOIL FOR A TURBINE ENGINE

TECHNICAL FIELD

The disclosure generally relates to a composite airfoil, and more specifically, to a composite airfoil for a turbine engine.

BACKGROUND

A turbine engine typically includes an engine core with a compressor section, a combustor section, and a turbine section in serial flow arrangement. A fan section can be provided upstream of the compressor section. The compressor section compresses air which is channeled to the combustor section where it is mixed with fuel, where the mixture is then ignited for generating hot combustion gases. The combustion gases are channeled to the turbine section which extracts energy from the combustion gases for powering the compressor section, as well as for producing useful work to propel an aircraft in flight or to power a load, such as an electrical generator.

With the advent of composite materials, composites have been used to make components of the turbine engine, especially in lower temperature regions, for example, the blades of the fan section. Composite materials typically include a fiber-reinforced matrix and exhibit a high strength to weight ratio. Due to the high strength to weight ratio and moldability to adopt relatively complex shapes, composite materials are utilized in various applications, such as a turbine engine or an aircraft. Composite materials can be, for example, installed on or define a portion of the fuselage, wings, rudder, manifold, airfoil, or other components of the aircraft or turbine engine.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
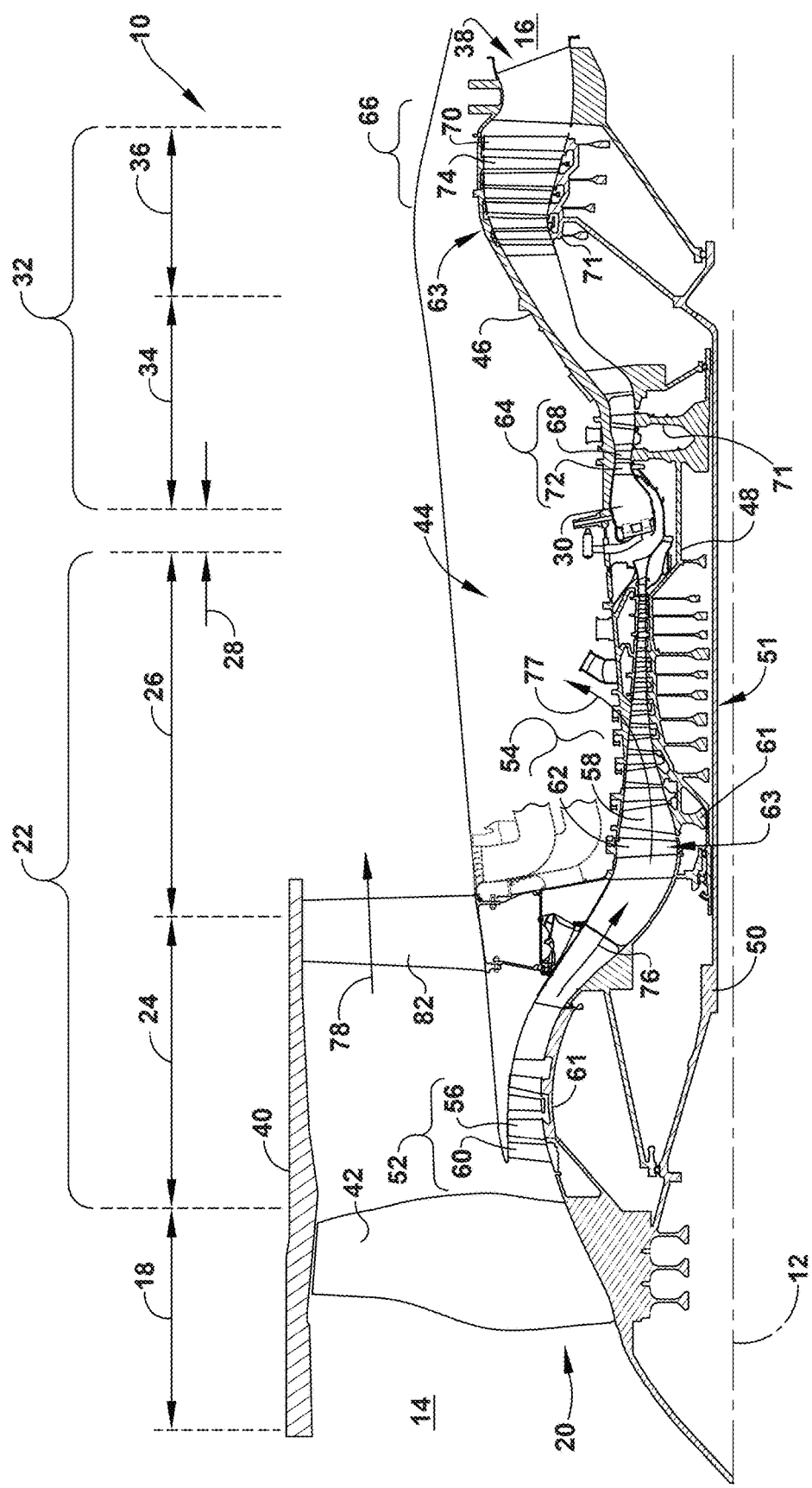
FIG. 1 is a schematic cross-sectional view of a turbine engine.

Aspects of the disclosure herein are directed to a composite component to be used in an engine component for a turbine engine. The composite component is illustrated as a composite airfoil that includes at least one airfoil body element. The airfoil body element includes a plies core or a spar core comprising of a set of composite plies and a composite wrap.

As used herein, the term "plies core" is a core defined by the set of composite plies. The plies core includes a pressure surface facing the pressure side of the composite airfoil and a suction surface facing the suction side of the composite airfoil. The term "facing" in this situation means that a first surface can define a second surface, be in contact with a second surface, or be spaced from and orientated towards. For example, when described as the pressure surface facing the pressure side, the pressure surface can define a portion of the pressure side, be in contact with a portion of the pressure side, be spaced from and orientated towards the pressure side, or any combination thereof.

The pressure surface and the suction surface extend between a fore end, proximate the leading edge, and an aft end, proximate the trailing edge. Together with a tip end, proximate the tip, the fore end and the aft end define a peripheral edge of the core. Optionally, when the composite airfoil includes mounting mechanisms other than a dove tail, the peripheral edge can be defined by a root end, the tip end proximate the tip, the fore end, and the aft end.

As used herein, the term "spar core" is a core having a spar, at least one support body in contact with the spar, and the set of composite plies. The set of composite plies are a set of polymer matrix composite plies applied to the spar, the at least one support body, or both. By way of non-limiting example, the spar of the spar core can include a spar leading edge and a spar trailing edge, where a first support body is in contact with the spar trailing edge and a second support body is in contact with the spar leading edge. The set of polymer matrix composite plies can extend over the first support body, the spar, the second support body, or any combination thereof.

The composite wrap overlays at least a portion of plies core or the spar core. The composite wrap is in contact with and extends from the pressure surface, over the peripheral edge, and to the suction surface. In other words, the composite wrap is in contact with the pressure surface, the peripheral edge, and the suction surface, while extending or wrapping from the pressure surface, over the peripheral edge, and to the suction surface. That is, the composite wrap, illustrated as a single sheet of ply, wraps around a stack of composite plies, illustrated as the set of composite plies. A first portion of the composite wrap contacts the pressure surface defined, at least in part, by a first ply of the set of composite plies closest to the pressure side. A second portion of the composite wrap contacts the suction surface defined, at least in part, by a second ply of the set of composite plies closest to the suction side. An end portion of the composite wrap contacts the peripheral edge of the plies core or the spar core at the tip end, the fore end, the aft end, a root end or any combination therein. Alternatively, in a different and non-limiting example, the end portion can be near the tip end, the fore end, the aft end, or the root end. As used herein "near" means that the end portion is within 15% or less of an airfoil chordwise length from the tip end, fore end, aft end, or the root end.

It is contemplated that the composite airfoil having the plies core and composite wrap can also include a skin that circumscribes the at least one airfoil body element to define at least part of an airfoil outer surface. The skin can be a laminate skin.

It is further contemplated that the composite airfoil having the spar core can also include a skin, where the skin can be defined by the set of polymer matrix composite plies and the composite wrap.

The composite airfoil benefits include an increase in strength, as the composite wrap wraps around and provides strength and structure in at least three dimensions. The increased strength, especially through the thickness of the composite airfoil, improves performance during an impact event.

Another benefit is the single ply or composite wrap that encompasses several sides of the set of composite plies. The wrap-around feature of the composite wrap improves lamination of the set of composite plies by encompassing the set of composite plies with the composite wrap.

Additionally, the composite airfoil benefits include a weight savings due to the use of composite material(s).

It should be understood that the disclosure applies to other engine components of the turbine engine, not just an airfoil, such as a disk or combustor liner, in non-limiting examples. Further, while described in terms of a core used in the manufacture of an airfoil, it will be appreciated that the present disclosure is applicable to any other suitable environment.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

As used herein, the terms "first", "second", or "third" may be used interchangeably to distinguish one component from another and are not intended to signify location or importance of the individual components.

The term "at least one of" in the context of, e.g., "at least one of A, B, and C" refers to only A, only B, only C, or any combination of A, B, and C.

The term "turbomachine" or "turbomachinery" refers to a machine including one or more compressors, a heat generating section (e.g., a combustion section), and one or more turbines that together generate a torque output.

The term "turbine engine" refers to an engine having a turbomachine as all or a portion of its power source. Example turbine engines include turbofan engines, turboprop engines, turbojet engines, turboshaft engines, etc., as well as hybrid-electric versions of one or more of these engines.

As used herein, the term "upstream" refers to a direction that is opposite the fluid flow direction, and the term "downstream" refers to a direction that is in the same direction as the fluid flow. The terms "fore" or "forward" mean in front of something and "aft" or "rearward" mean behind something. For example, when used in terms of fluid flow, fore/forward can mean upstream and aft/rearward can mean downstream.

As used herein, the terms "axial" and "axially" refer to directions and orientations that extend substantially parallel to a centerline of the turbine engine. Moreover, the terms "radial" and "radially" refer to directions and orientations that extend substantially perpendicular to the centerline of the turbine engine. For example, in the overall context of a turbine engine, radial refers to a direction along a ray extending between a center longitudinal axis of the engine and an outer engine circumference. In addition, as used herein, the terms "circumferential" and "circumferentially" refer to directions and orientations that extend arcuately about the centerline of the turbine engine.

The terms "coupled," "fixed," "applied to" and the like refer to both direct coupling, fixing, or attaching, as well as indirect coupling, fixing, or attaching through one or more intermediate components or features, unless otherwise specified herein.

All directional references (e.g., radial, axial, upper, lower, front, back, top, bottom, above, below, vertical, horizontal, clockwise, counterclockwise, upstream, downstream, forward, fore, aft, etc.) are only used for identification purposes to aid the reader's understanding of the present disclosure, and do not create limitations, particularly as to the position, orientation, or use of aspects of the disclosure described herein. Connection references (e.g., attached, coupled, connected, and joined) are to be construed broadly and can include intermediate structural elements between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

The singular forms "a", "an", and "the" include plural references unless the context clearly dictates otherwise. Furthermore, as used herein, the term "set" or a "set" of elements can be any number of elements, including only one.

The term "parallel" refers to generally parallel, where first and second lines extend such that a third line can be drawn that crosses the first and second lines, wherein the third line is in a range of 85 degrees to 95 degrees to both the first line and the second line.

The term "perpendicular" refers to generally perpendicular, where the angle between a first line and a second line is in a range of 85 degrees to 95 degrees.

The term, "tangent" is a straight line or plane that touches a curve or curved surface at a single point.

The term "composite," as used herein, is indicative of a component having two or more materials. A composite can be a combination of at least two or more metallic, non-metallic, or a combination of metallic and non-metallic elements or materials. Examples of a composite material can be, but not limited to, a polymer matrix composite (PMC), a ceramic matrix composite (CMC), a metal matrix composite (MMC), carbon fibers, polymeric resins, thermoplastics, bismaleimide (BMI) materials, polyimide materials, epoxy resins, glass fibers, silicon matrix materials, silicate glass fibers (e.g., aluminosilicates), carbon fibers, aramid fibers, or combinations thereof. That is, unless explicitly stated, a composite material can be, but is not limited to, PMC, CMC, or MMC.

As used herein, a "composite" component refers to a structure or a component including any suitable composite material. Composite components, such as a composite airfoil, can include several layers or plies of composite material. The layers or plies can vary in stiffness, material, and dimension to achieve the desired composite component or composite portion of a component having a predetermined weight, size, stiffness, and strength.

One or more layers of adhesive can be used in forming or coupling composite components. Adhesives can include resin and phenolics, wherein the adhesive can require curing at elevated temperatures or other hardening techniques.

In the present disclosure, when a layer is being described as "on" or "over" another layer or substrate, it is to be understood that the layers can either be directly contacting each other or have another layer or feature between the layers, unless expressly stated to the contrary. Thus, these terms are simply describing the relative position of the layers to each other and do not necessarily mean "on top of" since the relative position above or below depends upon the orientation of the device to the viewer.

As used herein, PMC refers to a class of materials. By way of example, the PMC material is defined in part by a prepreg, which is a reinforcement material pre-impregnated with a polymer matrix material, such as thermoplastic resin. Non-limiting examples of processes for producing thermoplastic prepregs include hot melt pre-pregging in which the fiber reinforcement material is drawn through a molten bath of resin and powder pre-pregging in which a resin is deposited onto the fiber reinforcement material, by way of non-limiting example electrostatically, and then adhered to the fiber, by way of non-limiting example, in an oven or with the assistance of heated rollers. The prepregs can be in the form of unidirectional tapes or woven fabrics, which are then stacked on top of one another to create the number of stacked plies desired for the part.

Multiple layers of prepreg are stacked to the proper thickness and orientation for the composite component and then the resin is cured and solidified to render a fiber reinforced composite part. Resins for matrix materials of PMCs can be generally classified as thermosets or thermoplastics. Thermoplastic resins are generally categorized as polymers that can be repeatedly softened and flowed when heated and hardened when sufficiently cooled due to physical rather than chemical changes. Notable example classes of thermoplastic resins include nylons, thermoplastic polyesters, polyaryletherketones, and polycarbonate resins. Specific examples of high-performance thermoplastic resins that have been contemplated for use in aerospace applications include, polyetheretherketone (PEEK), polyetherketoneketone (PEKK), polyetherimide (PEI), polyaryletherketone (PAEK), and polyphenylene sulfide (PPS). In contrast, once fully cured into a hard rigid solid, thermoset resins do not undergo significant softening when heated, but instead thermally decompose when sufficiently heated. Notable examples of thermoset resins include epoxy, bismaleimide (BMI), and polyimide resins.

Instead of using a prepreg, in another non-limiting example, with the use of thermoplastic polymers, it is possible to utilize a woven fabric. Woven fabric can include, but is not limited to, dry carbon fibers woven together with thermoplastic polymer fibers or filaments. Non-prepreg braided architectures can be made in a similar fashion. With this approach, it is possible to tailor the fiber volume of the part by dictating the relative concentrations of the thermoplastic fibers and reinforcement fibers that have been woven or braided together. Additionally, different types of reinforcement fibers can be braided or woven together in various concentrations to tailor the properties of the part. For example, glass fibers, carbon fibers, and thermoplastic fibers could all be woven together in various concentrations to tailor the properties of the part. The carbon fibers provide the strength of the system, the glass fibers can be incorporated to enhance the impact properties, which is a design characteristic for parts located near the inlet of the engine, and the thermoplastic fibers provide the binding for the reinforcement fibers.

In yet another non-limiting example, resin transfer molding (RTM) can be used to form at least a portion of a composite component. Generally, RTM includes the application of dry fibers or matrix material to a mold or cavity. The dry fibers or matrix material can include prepreg, braided material, woven material, or any combination thereof.

Resin can be pumped into or otherwise provided to the mold or cavity to impregnate the dry fibers or matrix material. The combination of the impregnated fibers or matrix material and the resin are then cured and removed from the mold. When removed from the mold, the composite component can require post-curing processing.

It is contemplated that RTM can be a vacuum assisted process. That is, the air from the cavity or mold can be removed and replaced by the resin prior to heating or curing. It is further contemplated that the placement of the dry fibers or matrix material can be manual or automated.

The dry fibers or matrix material can be contoured to shape the composite component or direct the resin. Optionally, additional layers or reinforcing layers of material differing from the dry fiber or matrix material can also be included or added prior to heating or curing.

A core of the PMC component can be layers of ply or woven material. In another different and non-limiting example, the core of the PMC component can include one or more of a spar, foam, or honeycomb structure on which PMC plies are applied.

As used herein, CMC refers to a class of materials with reinforcing fibers in a ceramic matrix. Generally, the reinforcing fibers provide structural integrity to the ceramic matrix. Some examples of reinforcing fibers can include, but are not limited to, non-oxide silicon-based materials (e.g., silicon carbide, silicon nitride, or mixtures thereof), non-oxide carbon-based materials (e.g., carbon), oxide ceramics (e.g., silicon oxycarbides, silicon oxynitrides, aluminum oxide ($Al_2O_3$), silicon dioxide ($SiO_2$), aluminosilicates such as mullite, or mixtures thereof), or mixtures thereof.

Some examples of ceramic matrix materials can include, but are not limited to, non-oxide silicon-based materials (e.g., silicon carbide, silicon nitride, or mixtures thereof), oxide ceramics (e.g., silicon oxycarbides, silicon oxynitrides, aluminum oxide ($Al_2O_3$), silicon dioxide ($SiO_2$), aluminosilicates, or mixtures thereof), or mixtures thereof. Optionally, ceramic components (e.g., oxides of Si, Al, Zr, Y, and combinations thereof) and inorganic fillers (e.g., pyrophyllite, wollastonite, mica, talc, kyanite, and montmorillonite) can also be included within the ceramic matrix.

Generally, particular CMCs can be referred to as their combination of type of fiber/type of matrix. For example, C/SiC for carbon-fiber-reinforced silicon carbide, SiC/SiC for silicon carbide-fiber-reinforced silicon carbide, SiC/SiN for silicon carbide fiber-reinforced silicon nitride, SiC/SiC-SiN for silicon carbide fiber-reinforced silicon carbide/silicon nitride matrix mixture, etc. In other examples, the CMCs can be comprised of a matrix and reinforcing fibers comprising oxide-based materials such as aluminum oxide ($Al_2O_3$), silicon dioxide ($SiO_2$), aluminosilicates, and mixtures thereof. Aluminosilicates can include crystalline materials such as mullite ($3Al_2O_3 \cdot 2SiO_2$), as well as glassy aluminosilicates.

In certain non-limiting examples, the reinforcing fibers may be bundled, coated, or both, prior to inclusion within the ceramic matrix. For example, bundles of the fibers may be formed as a reinforced tape, such as a unidirectional reinforced tape. A plurality of the tapes may be laid up together to form a preform component. The bundles of fibers can be impregnated with a slurry composition prior to forming the preform or after formation of the preform. The preform may then undergo thermal processing and subsequent chemical processing, such as melt-infiltration with silicon, to arrive at a component formed of a CMC material having a desired chemical composition. For example, the preform may undergo a cure or burn-out to yield a high char residue in the preform, and subsequent melt-infiltration with silicon, or a cure or pyrolysis to yield a silicon carbide matrix in the preform, and subsequent chemical vapor infiltration with silicon carbide. Additional steps may be taken to improve densification of the preform, either before or after chemical vapor infiltration, by injecting it with a liquid resin or polymer followed by a thermal processing step to fill the voids with silicon carbide. CMC material as used herein may be formed using any known or hereinafter developed methods including but not limited to melt infiltration, chemical vapor infiltration, polymer impregnation pyrolysis (PIP), or any combination thereof.

The reinforcing fibers can be at least portions of individual filaments or strands. As used herein, a "ceramic fiber tow," a "fiber tow," or simply a "tow" refers to a bundle of a plurality of individual fibers, filaments, or loose strands. The filaments of a tow may be randomly intermingled or arranged in a pattern, and the filaments may be continuous or non-continuous. For example, a tow may include broken filaments or filament segments. As another example, the filaments of a tow may be substantially parallel, twisted, or otherwise arranged. A tow may act substantially in the same manner as a single or individual filament. It will also be appreciated that an "individual ceramic filament," or simply an "individual filament," as used herein, refers to a singular or non-bundled elongate ceramic member.

Such materials, along with certain monolithic ceramics (i.e., ceramic materials without a reinforcing material), are particularly suitable for higher temperature applications. Additionally, these ceramic materials are lightweight compared to superalloys, yet can still provide strength and durability to the component made therefrom. Therefore, such materials are currently being considered for many turbine components used in higher temperature sections of turbine engines, such as airfoils (e.g., turbine blades, and vanes), combustors, shrouds, and other like components, which would benefit from the lighter-weight and higher temperature capability these materials can offer.

The term "metallic" as used herein is indicative of a material that includes metal such as, but not limited to, titanium, iron, aluminum, stainless steel, brass, copper, and nickel alloys. A metallic material or alloy can be a combination of at least two or more elements or materials, where at least one is a metal.

FIG. 1 is a schematic cross-sectional diagram of a turbine engine 10 for an aircraft. The turbine engine 10 has a generally longitudinally extending axis or engine centerline 12 extending from a forward end 14 to an aft end 16. The turbine engine 10 includes, in downstream serial flow relationship, a set of circumferentially spaced blades or propellers defining a fan section 18 including a fan 20, a compressor section 22 including a booster or low pressure (LP) compressor 24 and a high pressure (HP) compressor 26, a combustion section 28 including a combustor 30, a turbine section 32 including an HP turbine 34 and an LP turbine 36, and an exhaust section 38. The turbine engine 10 as described herein is meant as a non-limiting example, and other architectures are possible, such as, but not limited to, a steam turbine engine, a supercritical carbon dioxide turbine engine, or any other suitable turbine engine.

An exterior surface, defined by a housing, such as a nacelle 40, of the turbine engine 10 extends from the forward end 14 of the turbine engine 10 toward the aft end 16 of the turbine engine 10. Optionally, the nacelle 40 can cover at least a portion of the compressor section 22, the combustion section 28, the turbine section 32, the exhaust section 38, or combinations thereof.

The fan section 18 can be positioned at a forward portion of the nacelle 40. The fan section 18 includes a set of fan blades 42, and a set of stationary fan vanes 82 downstream the set of fan blades 42, both disposed radially about the engine centerline 12. The turbine engine 10 includes any number of one or more sets of rotating blades or propellers (e.g., the set of fan blades 42) disposed upstream of the set of stationary fan vanes 82. As a non-limiting example, the turbine engine 10 can include multiple sets of fan blades 42 or the set of stationary fan vanes 82. The turbine engine 10 is further defined by the location of the fan section 18 with respect to the combustion section 28. The fan section 18 can be upstream, downstream, or in-line with the axial positioning of the combustion section 28.

The compressor section 22, the combustion section 28, and the turbine section 32 are collectively referred to as an engine core 44, which generates combustion gases. The engine core 44 is surrounded by an engine casing 46, which is operatively coupled with a portion of the nacelle 40 of the turbine engine 10.

An HP shaft or spool 48 disposed coaxially about the engine centerline 12 of the turbine engine 10 drivingly connects the HP turbine 34 to the HP compressor 26. An LP shaft or spool 50, which is disposed coaxially about the engine centerline 12 of the turbine engine 10 within the larger diameter annular HP spool 48, drivingly connects the LP turbine 36 to the LP compressor 24 and fan 20. The spools 48, 50 are rotatable about the engine centerline 12 and couple to a set of rotatable elements, which collectively define a rotor 51.

It will be appreciated that the turbine engine 10 is either a direct drive or integral drive engine utilizing a reduction gearbox coupling the LP shaft or spool 50 to the fan 20.

The LP compressor 24 and the HP compressor 26, respectively, include a set of compressor stages 52, 54, in which a set of compressor blades 56, 58 rotate relative to a corresponding set of static compressor vanes 60, 62 (also called a nozzle) to compress or pressurize the stream of fluid passing through the stage. In a single compressor stage 52, 54, multiple compressor blades 56, 58 are provided in a ring and extend radially outwardly relative to the engine centerline 12, from a blade platform to a blade tip, while the corresponding static compressor vanes 60, 62 are positioned upstream of and adjacent to the compressor blades 56, 58. It is noted that the number of blades, vanes, and compressor stages shown in FIG. 1 were selected for illustrative purposes only, and that other numbers are possible.

The compressor blades 56, 58 for a stage 52, 54 of the compressor 24, 26 are mounted to a disk 61, which is mounted to the corresponding one of the HP and LP spools 48, 50, with each stage 52, 54 having its own disk 61. The static compressor vanes 60, 62 for a stage 52, 54 of the compressor 24, 26 are mounted to the engine casing 46 in a circumferential arrangement.

The HP turbine 34 and the LP turbine 36, respectively, include a set of turbine stages 64, 66, in which a set of turbine blades 68, 70 are rotated relative to a corresponding set of static turbine vanes 72, 74 (also called a nozzle) to extract energy from the stream of fluid passing through the stage 64, 66. In a single turbine stage 64, 66, multiple turbine blades 68, 70 are provided in a ring and extends radially outwardly relative to the engine centerline 12, from a blade platform to a blade tip, while the corresponding static turbine vanes 72, 74 are positioned upstream of and adjacent to the turbine blades 68, 70. It is noted that the number of blades, vanes, and turbine stages shown in FIG. 1 were selected for illustrative purposes only, and that other numbers are possible.

The turbine blades 68, 70 for a stage of the turbine section 32 are mounted to a disk 71, which is mounted to the corresponding one of the HP and LP spools 48, 50, with each stage 64, 66 having a dedicated disk 71. The static turbine vanes 72, 74 for a stage of the turbine section 32 are be mounted to the engine casing 46 in a circumferential arrangement.

Rotary portions of the turbine engine 10, such as the blades 56, 58 68, 70 among the compressor section 22 and the turbine section 32 are also referred to individually or collectively as the rotor 51. As such, the rotor 51 refers to the combination of rotating elements throughout the turbine engine 10.

Complementary to the rotor 51, the stationary portions of the turbine engine 10, such as the static vanes 60, 62, 72, 74 among the compressor section 22 and the turbine section 32 are also referred to individually or collectively as a stator 63. As such, the stator 63 refers to the combination of non-rotating elements throughout the turbine engine 10.

During operation of the turbine engine 10, a portion of the inlet airflow 78 enters the engine core 44 and is described as a working airflow 76, which is used for combustion within the engine core 44.

More specifically, the working airflow 76 flows into the LP compressor 24, which then pressurizes the working airflow 76 thus defining a pressurized airflow that is supplied to the HP compressor 26, which further pressurizes the air. The working airflow 76, or the pressurized airflow, from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the working airflow 76, or exhaust gas, is ultimately discharged from the turbine engine 10 via the exhaust section 38. The driving of the LP turbine 36 drives the LP spool 50 to rotate the fan 20 and the LP compressor 24. The working airflow 76, including the pressurized airflow and the combustion gases, defines a working airflow that flows through the compressor section 22, the combustion section 28, and the turbine section 32 of the turbine engine 10.

The inlet airflow 78 flows through the set of fan blades 42. Subsequently, the inlet airflow 78 flows over at least a portion of the set of stationary fan vanes 82, which directs the inlet airflow 78 such that it is transverse toward the engine centerline 12. The inlet airflow 78 then flows past the set of stationary fan vanes 82 and toward the exhaust section 38. A pylon can mount the turbine engine 10 to an exterior structure (e.g., a fuselage of an aircraft, a wing, a tail wing, etc.).

The working airflow 76 and at least some of the inlet airflow 78 merge downstream of the exhaust section 38 of the turbine engine 10. The working airflow 76 and the inlet airflow 78, together, form an overall thrust of the turbine engine 10.

It is contemplated that a portion of the working airflow 76 is drawn as bleed air 77 (e.g., from the compressor section 22). The bleed air 77 provides an airflow to engine components requiring cooling. The temperature of the working airflow 76 exiting the combustor 30 is significantly increased with respect to the working airflow 76 within the compressor section 22. As such, cooling provided by the bleed air 77 can be used for cooling engine components in the heightened temperature environments or a hot portion of the turbine engine 10. In the context of the turbine engine 10, the hot portions of the engine are normally downstream of the combustor 30, especially the turbine section 32, with the HP turbine 34 being the hottest portion as it is directly downstream of the combustion section 28. Other sources of cooling fluid are, but are not limited to, fluid discharged from the LP compressor 24 or the HP compressor 26.

Figure 2:
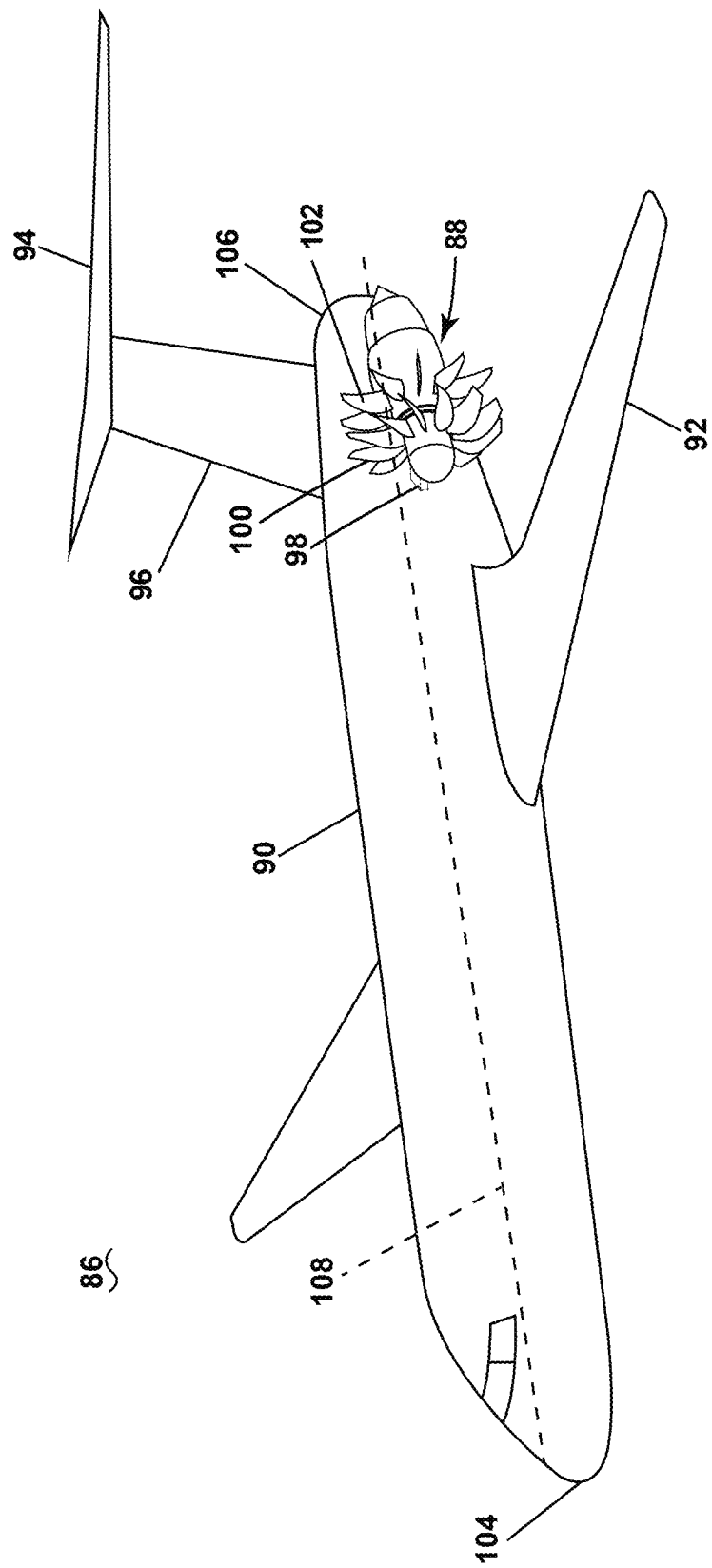
FIG. 2 is a schematic perspective view of an aircraft including an unducted or open rotor turbine engine.

FIG. 2 is a schematic perspective view of an aircraft 86 including a generic unducted turbine engine 88 suitable for use as the turbine engine 10 of FIG. 1. The aircraft 86 includes a fuselage 90 with an exterior surface. At least one wing 92 and a tail wing 94 extend from the fuselage 90. The tail wing 94 is operably coupled to and spaced from the fuselage 90 via a tail wing pylon 96. The unducted turbine engine 88 is operably coupled to the exterior surface of the fuselage 90 via a pylon 98. While illustrated as coupled to the exterior surface of the fuselage 90, it is contemplated that the generic unducted turbine engine 88 can be mounted under the wing 92.

The unducted turbine engine 88 includes a set of circumferentially spaced fan blades 100. A set of stationary fan vanes 102 is provided downstream of the set of circumferentially spaced fan blades 100. The fuselage 90 extends between a nose 104 and a tail 106 and includes a fuselage centerline 108 extending therebetween.

Additionally, while the tail wing 94 is illustrated as a T-wing tail wing, other tail wings are contemplated such as, a cruciform tail wing, an H-tail, a triple tail, a V-tail, an inverted tail, a Y-tail, a twin-tail, a boom-mounted tail, or a ring tail, all of which are referred to herein as the tail wing 94.

Figure 3:
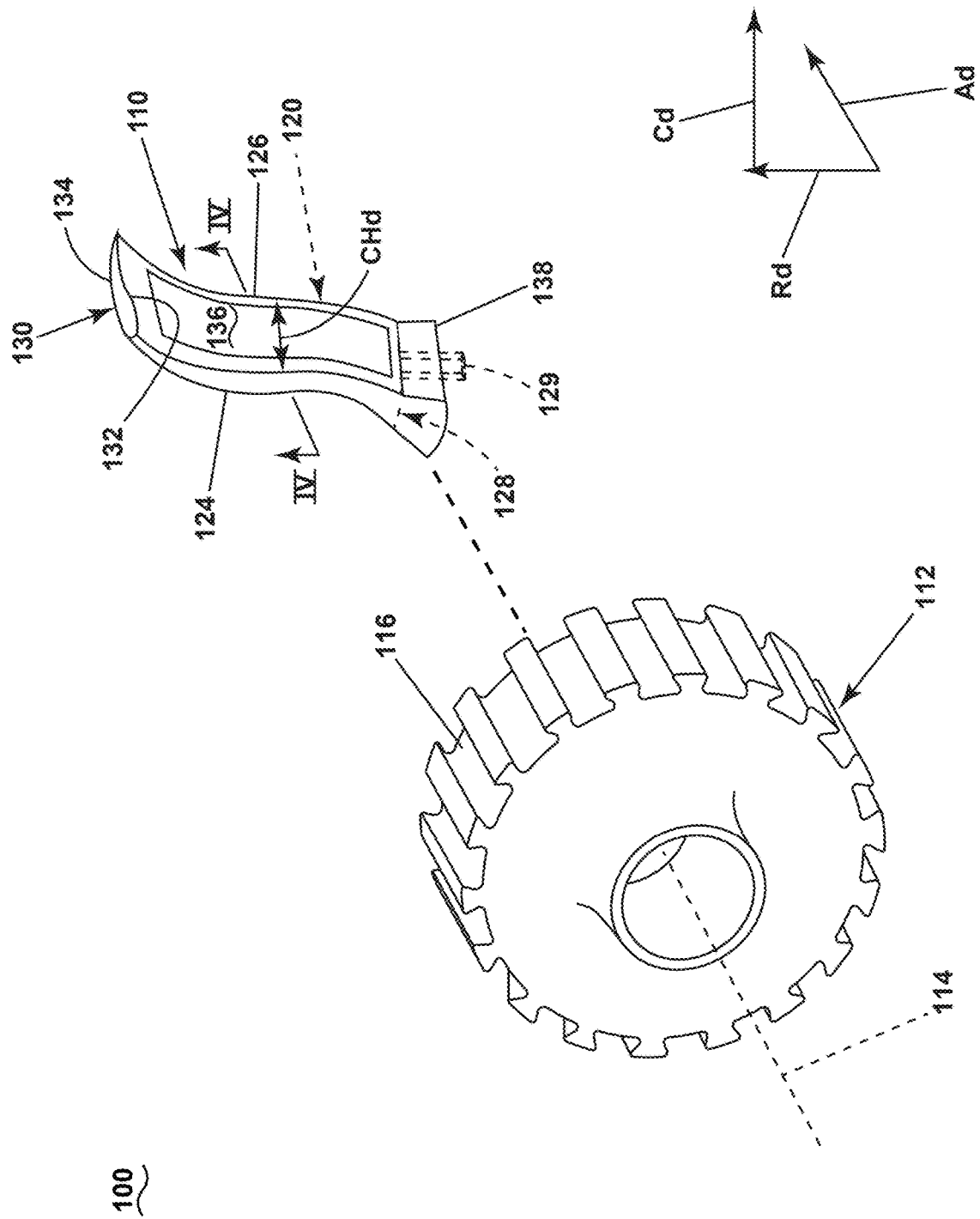
FIG. 3 is a schematic perspective view of a composite airfoil and a disk assembly suitable for use within the turbine engine of FIG. 1 and FIG. 2, in accordance with an exemplary embodiment of the present disclosure.

FIG. 3 is a schematic perspective view of a composite airfoil 110 and a disk assembly 112 suitable for use within the turbine engine 10 of FIG. 1 or the unducted turbine engine 88 of FIG. 2. The disk assembly 112 is suitable for use as the disk 61, 71 (FIG. 1) or any other disk such as, but not limited to, a disk within the fan section 18, the compressor section 22, or the turbine section 32 of the turbine engine 10. The composite airfoil 110 can be rotating or non-rotating such that the composite airfoil 110 can include at least one of the static compressor vanes 60, 62 (FIG. 1), the set of compressor blades 56, 58 (FIG. 1), the static turbine vanes 72, 74 (FIG. 1), the set of turbine blades 68, 70 (FIG. 1), or the set of fan blades 42 (FIG. 1). As a non-limiting example, the composite airfoil 110 can be a composite fan blade assembly.

The disk assembly 112 can be rotatable or stationary about a rotational axis 114. The rotational axis 114 can coincide with or be offset from the engine centerline (e.g., the engine centerline 12 of FIG. 1). The disk assembly 112 includes a plurality of slots 116 extending axially through a radially outer portion of the disk assembly 112 and being circumferentially spaced about the disk assembly 112, with respect to the rotational axis 114.

The composite airfoil 110 extends between a leading edge 124 and a trailing edge 126, opposite the leading edge 124, to define a chord-wise direction (CHd). The composite airfoil 110 extends between a root 128 and a tip 130 to define a radial direction (Rd). An airfoil outer surface 136 of the composite airfoil 110 is defined by a pressure side 132 and a suction side 134, opposite the pressure side 132. The pressure side 132 and the suction side 134 extend radially in the radial direction (Rd) from the root 128 to the tip 130. The suction side 134 can mirror the pressure side 132 and have the same surface area. However, it is contemplated that the surface area of the suction side 134 can be less than or greater than the surface area of the pressure side 132.

The leading edge 124 and the trailing edge 126, extend radially from the root 128 to the tip 130. A dovetail portion 138 can extend from the root 128 of the composite airfoil 110. Optionally, a mounting mechanism 129 can replace the dove tail portion 138. The mounting mechanism 129 can extend from the root 128 of the composite airfoil 110 and be used to fasten the composite airfoil 110 to the turbine engine 10 or the unducted turbine engine 88. The mounting mechanism 129 can include, by way of example, a spar or other fastening mechanism. The mounting mechanism 129 can include composite material, metallic material, or any combination thereof.

Optionally, the composite airfoil 110 includes a cladding 120. The cladding 120 can include a metallic material.

The composite airfoil 110 is coupled to the disk assembly 112 by inserting at least a portion of the dovetail portion 138 into a respective slot of the plurality of slots 116. The composite airfoil 110 is held in place by frictional contact with the slot 116. Additionally, or alternatively, the composite airfoil 110 can be coupled to the slot 116 via any suitable coupling method such as, but not limited to, welding, adhesion, fastening, or the like. While only a single composite airfoil 110 is illustrated, it will be appreciated that there can be any number of composite airfoils 110 coupled to the disk assembly 112. As a non-limiting example, there can be a plurality of composite airfoil 110 corresponding to a total number of slots of the plurality of slots 116.

For the sake of reference, a set of relative reference directions, along with a coordinate system can be applied to the composite airfoil 110. An axial direction (Ad) can extend from forward to aft and is shown extending at least partially into the page. The axial direction (Ad) can be arranged parallel to the rotational axis 114. A radial direction (Rd) extends perpendicular to the axial direction (Ad) and can extend perpendicular to the engine centerline 12 (FIG. 1). A circumferential direction (Cd) can be defined perpendicular to the radial direction (Rd) and can be defined along the circumference of the turbine engine 10 (FIG. 1) relative to the engine centerline 12 (FIG. 1).

Figure 4:
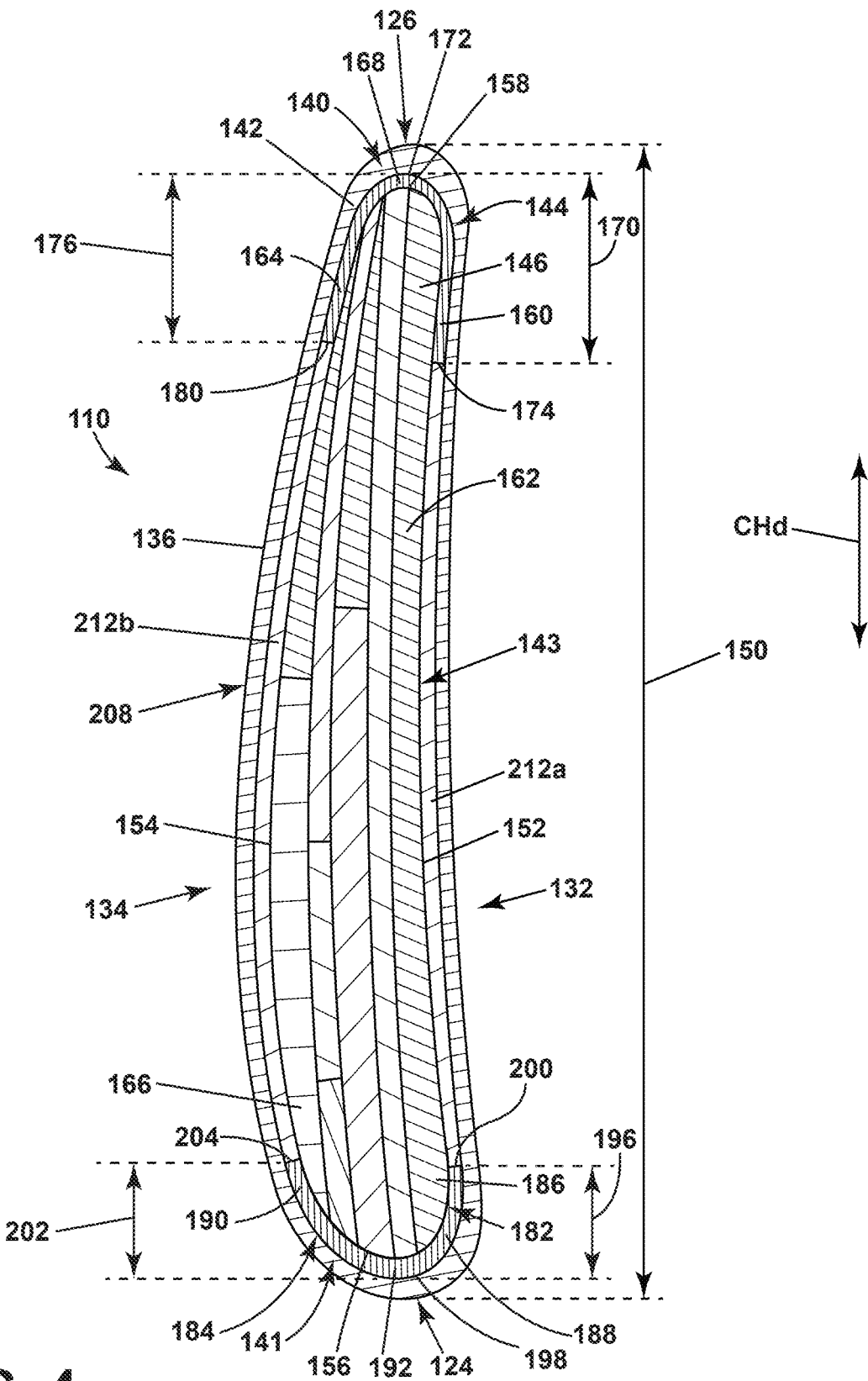
FIG. 4 is a schematic cross-sectional view taken along line IV-IV of FIG. 3 showing an interior of the composite airfoil, including airfoil body elements, in accordance with an exemplary embodiment of the present disclosure.

FIG. 4 is a schematic cross-sectional view taken along line IV-IV of FIG. 3 showing an interior of the composite airfoil 110, including at least one airfoil body element. The at least one airfoil body element is illustrated, by way of example, as a set of airfoil body elements that includes a first airfoil body element 140 and a second airfoil body element 141, spaced in the chordwise direction (CHd) from the first airfoil body element 140. While illustrated as spaced from the first airfoil body element 140, it is contemplated, in different and non-limiting examples, that the second airfoil body element 141 can abut or overlap one or more portions of the first airfoil body element 140.

The first airfoil body element 140 includes a plies core 142 and a composite wrap 144 that overlays at least a portion of the plies core 142. The plies core 142 can define at least a portion of an airfoil core 143.

The plies core 142 is defined by a set of composite plies 146. The plies core 142 does not include foam, foam-based pieces, or a three-dimensional woven core. Each layer or piece of the set of composite plies 146 can include a woven pattern, but adjacent plies in the set of composite plies 146 are not woven together. It is contemplated that the plies core 142, the airfoil core 143, consists of one or more sets of composite plies 146.

The set of composite plies 146 of the first airfoil body element 140 include a pressure ply 162 closest to the pressure side 132 and a suction ply 166 closest to the suction side 134. A pressure surface 152 of the plies core 142 is defined, at least in part, by the pressure ply 162 closest to the pressure side 132. A suction surface 154 of the plies core 142 is defined, at least in part, by the suction ply 166 closest to the suction side 134.

The pressure surface 152 and the suction surface 154 of the plies core 142 extend between a fore end 156 of the airfoil core 143, proximate the leading edge 124, and an aft end 158 of the airfoil core 143, proximate the trailing edge 126. While illustrated as defined by a single ply, the pressure surface 152, the suction surface 154, or both, can be defined by any number of plies.

The set of composite plies 146 are illustrated, by way of example, as having five layers with distal ends of the plies terminating at and in contact with the composite wrap 144 of the first airfoil body element 140. However, any number of layers or ply pieces are contemplated to define the plies core 142.

A subset of the set of composite plies 146 can extend from the fore end 156 to the aft end 158, although any number, including zero plies can extend from the fore end 156 to the aft end 158.

As illustrated, by way of example, the thickness of each ply of the set of composite plies 146 can change in one or more directions, such as the chordwise direction (CHd). Alternatively, the thickness of each ply or piece of ply can remain constant.

It is further contemplated that the number of layers, ply pieces, ply thickness, or a combination thereof, can change in the axial direction (Ad) (FIG. 3), the radial direction (Rd) (FIG. 3), or both.

The composite wrap 144 of the first airfoil body element 140 is in contact with and extends from the pressure surface 152 of the plies core 142, over the aft end 158, and to the suction surface 154. That is, the composite wrap 144 wraps around the aft end 158 of the set of composite plies 146.

The composite wrap 144 can include a first portion 160, a second portion 164, and an end portion 168. The first portion 160 contacts the pressure surface 152. The second portion 164 contacts the suction surface 154. The end portion 168 of the composite wrap 144 contacts the aft end 158 of the plies core 142.

The first portion 160 of the composite wrap 144 of the first airfoil body element 140 extends a first chordwise distance 170 in the chordwise direction (CHd). The first chordwise distance 170 can be measured from a trailing end 172 of the composite wrap 144 to a pressure end 174. The trailing end 172 is the point of the composite wrap 144 closest to or at the trailing edge 126. The pressure end 174 is the farthest point from the trailing end 172 that the composite wrap 144 extends along the pressure surface 152 in the chordwise direction (CHd). The first chordwise distance 170 is in a range from 2%-100% of an airfoil chordwise length 150. The airfoil chordwise length 150 is measured from the leading edge 124 to the trailing edge 126 of the composite airfoil 110. For example, the first chordwise distance 170 can be in a range from 2% to 50%, 2% to 40%, 2% to 30%, 5% to 50%, 5% to 40%, 5% to 30%, or 10% to 30% of the airfoil chordwise length 150. The first portion 160 of the composite wrap 144 of the first airfoil body element 140, having selected the first chordwise distance 170, can improve coupling between the composite wrap 144 and the plies core 142. Further, the first portion 160 of the composite wrap 144 provides strength and shape to the composite airfoil 110 the along the pressure surface 152.

The second portion 164 of the composite wrap 144 extends a second chordwise distance 176 in the chordwise direction (CHd). The second chordwise distance 176 can be measured from the trailing end 172 of the composite wrap 144 to a suction end 180. The suction end 180 is the farthest point from the trailing end 172 that the composite wrap 144 extends along the suction surface 154 in the chordwise direction (CHd). The second chordwise distance 176 is in a range from 2% to 100% of the airfoil chordwise length 150. For example, the second chordwise distance 176 is in a range from 2% to 50%, 2% to 40%, 2% to 30%, 5% to 50%, 5% to 40%, 5% to 30%, or 10% to 30% of the airfoil chordwise length 150. The second portion 164 of the composite wrap 144 of the first airfoil body element 140, having selected the second chordwise distance 176, can improve coupling between the composite wrap 144 and the plies core 142. Further, the second portion 164 of the composite wrap 144 provides strength and shape to the composite airfoil 110 the along the suction surface 156.

When combined, the first chordwise distance 170 and the second chordwise distance 176 can improve strength of the composite airfoil 110.

As illustrated, by way of example, the first chordwise distance 170 of the composite wrap 144 can be greater than the second chordwise distance 176 of the composite wrap 144 of the first airfoil body element 140. Alternatively, in a different and non-limiting example, the first chordwise distance 170 can be equal to or less than the second chordwise distance 176.

The composite wrap 144 includes, by way of non-limiting example, one or more of glass fibers, silicate glass fibers (e.g., aluminosilicates), carbon fibers, or aramid fibers. While illustrated as a single layer, it is contemplated that the composite wrap 144 can include multiple layers. It is contemplated that the multiple layers can have varying thickness, varying surface areas, or both.

The composite wrap 144 of the first airfoil body element 140 provides strength in at least three planes as the first airfoil body element 140 provides structure via a unitary ply extending from the pressure surface 152, over the aft end 158 and to the suction surface 154. That is, the composite wrap 144 of the first airfoil body element 140 includes a portion that is in a plane parallel to a portion of the pressure side 132, another portion that is in a plane parallel to a portion of the suction side 134, and yet another portion in a plane tangent to the trailing edge 126 that add strength to the composite airfoil 110 in each of those planes.

The second airfoil body element 141 includes a plies core 182 and a composite wrap 184 that overlays at least a portion of the plies core 182. The plies core 182 is defined by a set of composite plies 186.

The composite wrap 184 is in contact with and extends from the pressure surface 152, over the fore end 156 of the plies core 182, and to the suction surface 154. That is, the composite wrap 184 wraps around the fore end 156 of the set of composite plies 186. In other words, the distal ends of some or all of the set of composite plies 186 contact an inner surface of the composite wrap 184 of the second airfoil body element 141.

The pressure surface 152 facing the pressure side 132 and the suction surface 154 facing the suction side 134 are defined by the same pressure ply 162 and the same suction ply 166 as that of the first airfoil body element 140. However, it is contemplated that one or both of the pressure surface 152 or the suction surface 154 can be defined by different plies at different positions, such as in the chordwise direction (CHd).

The composite wrap 184 of the second airfoil body element 141 can include a first portion 188, a second portion 190, and an end portion 192. The first portion 188 contacts the pressure surface 152 and the second portion 190 contacts the suction surface 154. The end portion 192 of the composite wrap 184 of the second airfoil body element 141 contacts the fore end 156.

The first portion 188 of the composite wrap 184 extends a first chordwise distance 196 in the chordwise direction (CHd). The first chordwise distance 196 can be measured from a leading end 198 of the composite wrap 184 to a pressure end 200. The leading end 198 is located at a point of the composite wrap 184 closest to or at the leading edge 124. The pressure end 200 can be the farthest point from the leading end 198 that the composite wrap 184 extends along the pressure surface 152 in the chordwise direction (CHd). The first chordwise distance 196 is in a range from 2% to 100% of the airfoil chordwise length 150. For example, the first chordwise distance 196 can be in a range of 2% to 50%, 2% to 40%, 2% to 30%, 5% to 50%, 5% to 40%, 5% to 30%, or 10% to 30% of the airfoil chordwise length 150.

The set of composite plies 186 of the second airfoil body element 141 can include one or more of the same plies as the set of composite plies 146 of the first airfoil body element 140. It is contemplated that the set of composite plies 186 of the second airfoil body element 141 can include anywhere from all of the same plies to none of the same plies of the set of composite plies 146 of the first airfoil body element 140. Optionally, the set of composite plies 186 of the second airfoil body element 141 can be similar to the set of composite plies 146 of the first airfoil body element 140, where the set of composite plies 186 is the location which the composite wrap 184 of the second airfoil body element 141 wraps around the plies core 182. The set of composite plies 146 of the first airfoil body element 140 is the location at which the composite wrap 184 of the first airfoil body element 140 wraps around the plies core 142, where the plies core 142 of the first airfoil body element 140 and the plies core 182 of the second airfoil body element 141 can define portions of the airfoil core 143 of the composite airfoil 110.

A total pressure wrap distance is determined by adding the sum of first chordwise distances. That is, for example, the total pressure wrap distance of the composite airfoil 110 can be a sum of the first chordwise distance 170 of the first airfoil body element 140 and the first chordwise distance 196 of the second airfoil body element 141. The total pressure wrap distance can be in a range from 2% to 100% of the airfoil chordwise length 150. For example, the total pressure wrap distance can be in a range from 2% to 50%, 2% to 40%, 2% to 30%, 5% to 50%, 5% to 40%, 5% to 30%, 10% to 50%, 10% to 40%, or 15% to 40% of the airfoil chordwise length 150.

The second portion 190 of the composite wrap 184 extends a second chordwise distance 202 in the chordwise direction (CHd). The second chordwise distance 202 can be measured from the leading end 198 of the composite wrap 184 to a suction end 204. The suction end 204 is the farthest point from the leading end 198 that the composite wrap 184 extends along the suction surface 154 in the chordwise direction (CHd). The second chordwise distance 202 is in a range from 2% to 100% of the airfoil chordwise length 150. For example, the second chordwise distance 202 can be in a range from 2% to 50%, 2% to 40%, 2% to 30%, 5% to 50%, 5% to 40%, 5% to 30%, or 10% to 30% of the airfoil chordwise length 150.

A total suction wrap distance is determined by adding the sum of second chordwise distances. That is, for example, the total suction wrap distance is determined by adding the second chordwise distance 176 of the first airfoil body element 140 and the second chordwise distance 202 of the second airfoil body element 141. The total suction wrap distance can be in a range from 2% to 100% of the airfoil chordwise length 150. For example, the total suction wrap distance can be in a range from 2% to 50%, 2% to 40%, 2% to 30%, 5% to 50%, 5% to 40%, 5% to 30%, 10% to 50%, 10% to 40%, or 15% to 40% of the airfoil chordwise length 150.

As illustrated, by way of example, the first chordwise distance 196 can be greater than the second chordwise distance 202. Alternatively, in a different and non-limiting example, the first chordwise distance 196 of the composite wrap 184 can be equal to or less than the second chordwise distance 202 of the composite wrap 184.

The composite wrap 184 of the second airfoil body element 141 provides strength in at least three planes as the second airfoil body element 141 provides structure via a unitary ply extending from the pressure surface 152, over the fore end 156 and to the suction surface 154. That is, the composite wrap 184 of the second airfoil body element 141 includes a portion that is in a plane parallel to a portion of the pressure side 132, another portion that is in a plane parallel to a portion of the suction side 134, and yet another portion in a plane tangent to the leading edge 124 that add strength to the composite airfoil 110 in each of those planes.

Figure 7:
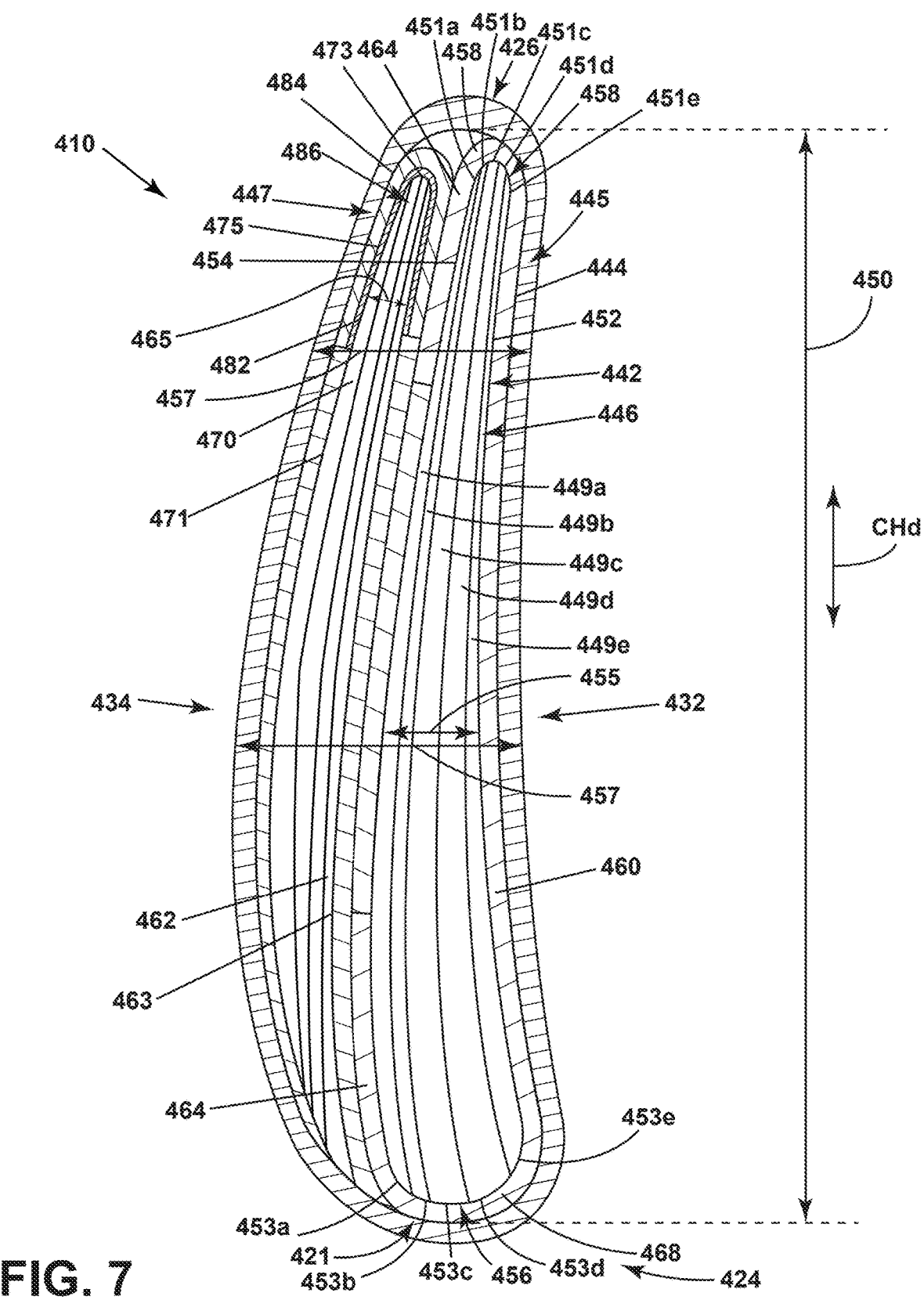
FIG. 7 is a variation of the schematic cross-sectional view of FIG. 4, in accordance with an exemplary embodiment of the present disclosure.

Optionally, in a different and non-limiting example and as further illustrated in FIG. 7, the composite wrap 144 can wrap around the aft end 158 and the fore end 156 by extending the length of the pressure surface 152 or extending the length of the suction surface 154, or both.

Optionally, the composite airfoil 110 can include a skin 208 that circumscribes the first airfoil body element 140 and the second airfoil body element 141 to define at least part of the airfoil outer surface 136. The skin 208 can be a laminate skin. That is, the skin 208 can be formed as a set of laminate layers, provided around or about the first airfoil body element 140 and the second airfoil body element 141. The skin 208 differs from the sets of composite plies 146, 186.

For example, one or more of weave, fiber direction, or material can vary between the set of composite plies 146 and the skin 208. That is, the skin 208 can be fabric that is not a uni-directional fiber like the set of composite plies 146. It is contemplated that the skin can be pre-impregnated, formed from automated fiber placement, formed from manually placement of plies, or dry fiber laminate layers, in non-limiting examples. Such laminate layers forming the skin 208 can be formed by resin transfer molding (RTM), partial RTM, same qualified resin transfer molding (SQRTM), or out-of-autoclave in non-limiting examples.

As illustrated, by way of example, the skin 208 can include skin plies 212a, 212b that extend between the composite wrap 144 of the first airfoil body element 140 and the composite wrap 184 of the second airfoil body element 141. The skin 208, the skin plies 212a, 212b, or both, can be applied to at least a portion of the plies core 142, the set of composite plies 146, 186, or both.

Each ply of the set of composite plies 146, 186 or the composite wrap 144, 184 can be comprised of composite materials, such as carbon or carbon fibers, glass or glass fibers, nylon, rayon, poly-para-phenylene terephthalamide fibers or other aramid fibers, while other materials such as nickel, steel, titanium, metal fibers, or ceramic composites, and various combinations thereof, are also contemplated in non-limiting examples. It is contemplated that one or more of the plies of the sets of composite plies 146, 186 can be made from a different material than the composite wraps 144, 184. It is further contemplated that one or more of the plies of the set of composite plies 146, 186, the composite wrap 144, 184, or one or more of the plies of the set of composite plies 146, 186 and the composite wrap 144, 184 can be made from a different material than the skin 208.

Figure 5:
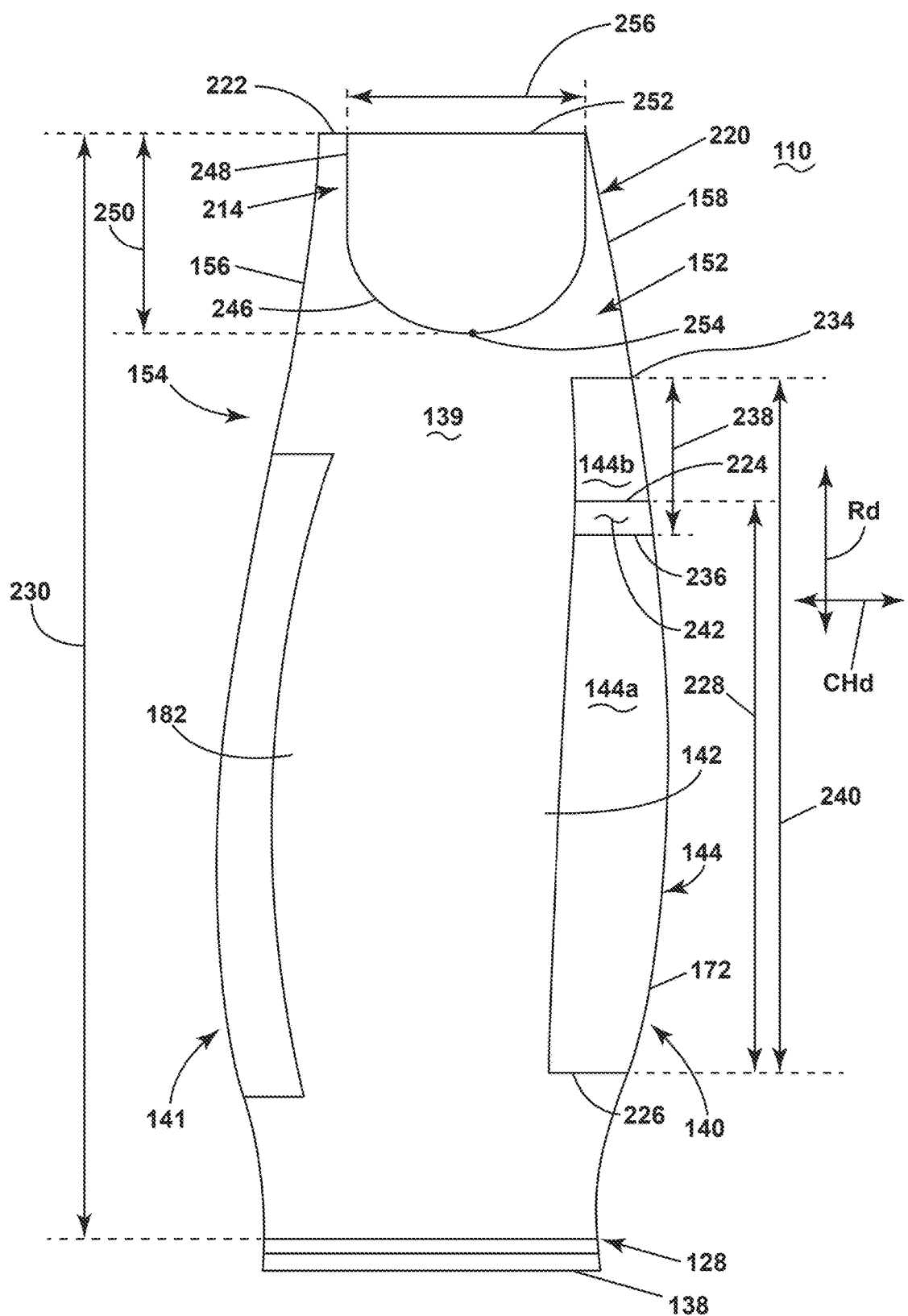
FIG. 5 is a side view of the composite airfoil of FIG. 3 with portions removed to further illustrate the airfoil body elements of FIG. 4 in accordance with an exemplary embodiment of the present disclosure.

FIG. 5 is an enlarged view of the composite airfoil 110 with the skin 208 (FIG. 4) removed for ease of understanding. The at least one airfoil body element of the composite airfoil 110 is illustrated, by way of example, as a set of airfoil body elements that includes the first airfoil body element 140, the second airfoil body element 141, and a third airfoil body element 214.

A peripheral edge 220 the composite airfoil 110 is defined by the fore end 156, the aft end 158, and a tip end 222. The tip end 222 connects the fore end 156 and the aft end 158, where the tip end 222 is proximate the tip 130 (FIG. 3).

The first airfoil body element 140 includes the composite wrap 144 that overlies at least a portion of the plies core 142, wherein the composite wrap 144 is in contact with and extends from the pressure surface 152, over the aft end 158, and to the suction surface 154. However, it is contemplated that the composite wrap 144 is in contact with and extends from the pressure surface 152, over any one or more portions of the peripheral edge 220, and to the suction surface 154. That is, by way of example, the composite wrap 144 can be in contact with and extend from the pressure surface 152, over one or more of the fore end 156, the aft end 158, or the tip end 222, and to the suction surface 154.

The composite wrap 144 can include one or more wraps, illustrated by way of non-limiting example as a first composite wrap 144a and a second composite wrap 144b. That is, the composite wrap 144 can be multiple composite wraps including at least the first composite wrap 144a and a second composite wrap 144b. However, it is contemplated that the composite wrap 144 can include any number of composite wraps that wrap around the set of composite plies 146 (FIG. 4).

The first composite wrap 144a can extend in the radial direction (Rd) from a tip edge 224 to a root edge 226, where the tip edge 224 is a portion of the first composite wrap 144*a* closest to the tip end 222 and the root edge 226 is a portion of the first composite wrap 144*a* closest to the root 128.

The first composite wrap 144*a* extends along the peripheral edge 220 a first radial distance 228 in the radial direction (Rd). The first radial distance 228 is in a range from 2% to 100% of an airfoil radial length 230. For example, the first radial distance 228 is in a range from 5% to 80%, 5% to 60%, 10% to 80%, 10% to 60%, 15% to 80%, 15% to 60%, or 20% to 60% of the airfoil radial length 230. The airfoil radial length 230 can be measured from the root 128 to the tip end 222. Alternatively, it is contemplated that the airfoil radial length 230 can be measured from the root 128 to the tip 130 (FIG. 3). Coverage of the peripheral edge 220 by one or more wraps, such as the first composite wrap 144*a* or the second composite wrap 144*b* can improve the strength through the thickness of the airfoil, while minimally increasing weight of the composite airfoil 110. The thickness of the composite airfoil 110 can be defined generally perpendicular to the chordwise direction (CHd).

The second composite wrap 144*b* can extend in the radial direction (Rd) from a tip edge 234 to a root edge 236, where the tip edge 234 is a portion of the second composite wrap 144*b* closest to the tip end 222 and the root edge 236 is a portion of the second composite wrap 144*b* closest to the root 128.

The second composite wrap 144*b* extends along the peripheral edge 220 a second radial distance 238 in the radial direction (Rd). The second radial distance 238 is in a range from 2% to 100% of the airfoil radial length 230. For example, the second radial distance 238 is in a range of from 5% to 80%, 5% to 60%, 10% to 80%, 10% to 60%, 15% to 80%, 15% to 60%, or 20% to 60% of the airfoil radial length 230.

A total radial coverage distance 240 can be the total length of aft end 158 covered by one or more composite wraps, illustrated by way of example as the first composite wrap 144*a* and the second composite wrap 144*b*. That is, for example, the total radial coverage distance 240 can be measured from the tip edge 234 of the second composite wrap 144*b* to the root edge 226 of the first composite wrap 144*a*. The total radial coverage distance 240 can be in a range from 2% to 100% of the airfoil radial length 230. For example, the total radial coverage distance 240 can be in a range from 10% to 90%, 10% to 70%, 15% to 90%, 15% to 70%, 20% to 90%, 20% to 70%, 30% to 90%, 30% to 70%, 40% to 90%, 40% to 70%, 50% to 90% or 50%-70% of the airfoil radial length 230.

As illustrated, by way of example, an overlap region 242 can be defined by the radial overlap of the first composite wrap 144*a* and the second composite wrap 144*b*. In a different and non-limiting example, the first composite wrap 144*a* and the second composite wrap 144*b* can be spaced. That is, the first composite wrap 144*a* and the second composite wrap 144*b* can be discrete or non-overlapping. In yet another different and non-limiting example, the first composite wrap 144*a* can abut the second composite wrap 144*b* in the radial direction (Rd).

The third airfoil body element 214 includes a plies core 246. Optionally, the plies core 246 can be another portion of the airfoil core 143 (FIG. 3). The plies core 246 can include a set of plies, where the set of plies can be defined by one or more of the same plies as the plies core 142 of the first airfoil body element 140, the plies core 182 of the second airfoil body element 141, or both.

A composite wrap 248 overlays at least a portion of the plies core 246 of the third airfoil body element 214. The composite wrap 248 extends from and is in contact with the pressure surface 152, wraps over at least a portion of the tip end 222 of the peripheral edge 220, and extends to and is in contact with the suction surface 154. A radial coverage distance 250 can be measured in a radial direction (Rd) from a tip edge 252 to a root edge 254, where the tip edge 252 is a portion of the composite wrap 248 closest to the tip end 222 and the root edge 254 is a portion of the composite wrap 248 closest to the root 128.

The radial coverage distance 250 of the third airfoil body element 214 is in a range from 2% to 100% of the airfoil radial length 230. For example, the radial coverage distance 250 is in a range of from 5% to 80%, 5% to 60%, 10% to 80%, 10% to 60%, 15% to 80%, 15% to 60%, or 20% to 60% of the airfoil radial length 230.

The composite wrap 248 of the third airfoil body element 214 can have a chord length 256 measured in the chordwise direction (CHd) along the tip end 222. The chord length 256 can be in a range of 2% to 100% of the airfoil chordwise length 150 (FIG. 3).

The first airfoil body element 140, the second airfoil body element 141, and the third airfoil body element 214 of the set of airfoil body elements are illustrated, by way of example, as spaced in the chordwise direction (CHd), the radial direction (Rd), or both the chordwise direction (CHd) and the radial direction (Rd). While illustrated as spaced, it is contemplated adjacent airfoil body elements of the set of airfoil body elements can abut or partially overlap in the chordwise direction (CHd), the radial direction (Rd), or both the chordwise direction (CHd) and the radial direction (Rd).

Figure 6:
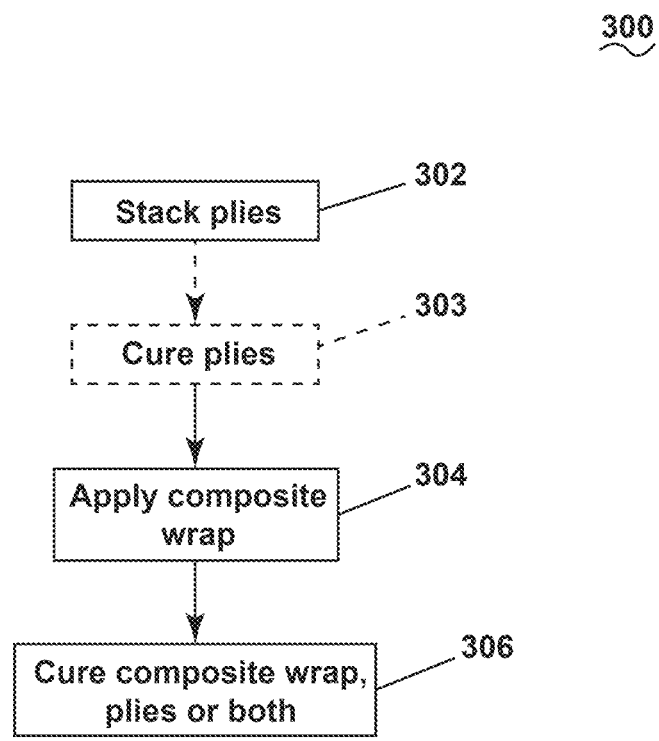
FIG. 6 is a flow chart illustrating a method of manufacturing the airfoil body element for the composite airfoil having a plies core, in accordance with an exemplary embodiment of the present disclosure.

FIG. 6 illustrates a method 300 of manufacturing an airfoil body element for a composite airfoil for a turbine engine 10 (FIG. 1), such as the airfoil body elements 140, 141 of the composite airfoil 110 (FIG. 4). The method includes, at 302, stacking multiple plies to form the set of composite plies 146, 186. It is contemplated that stacking multiples plies at 302 to form the set of composite plies 146, 186 includes stacking the multiple plies on at least part of the first portion 160, 188 of the composite wrap 144, 184.

Optionally, at 303, the set of composite plies 146, 186 can be cured.

At 304, the composite wrap 144, 184 or the remaining portions of the composite wrap 144, 184 is applied to the set of composite plies 146, 186. The composite wrap 144, 184 overlays and is in contact with portions of the pressure surface 152, a peripheral edge 220, and a suction surface 154 of the set of composite plies 146, 186.

That is, the composite wrap 144, 184 is wrapped about the set of composite plies 146, 186 such that the first portion 160, 188 of the composite wrap 144, 184 is in contact with the pressure surface 152, the second portion 164, 190 contacts the suction surface 154 of the set of composite plies 146, 186, and the end portion 168, 192 contacts the peripheral edge 220. The set of composite plies 146, 186 define a set of distal ends at the trailing end 172 or the leading end 198 that are in contact with the end portion 168, 192 of the composite wrap 144, 184.

Optionally, if the set of composite plies 146, 186 is cured at 303, an adhesive can be applied between the composite wrap 144, 184 and the set of composite plies 146, 186 to apply the composite wrap 144, 184 to the set of composite plies 146, 186.

At 306, the composite wrap 144, 184, the set of composite plies 146, 186, or both the composite wrap 144, 184 and the set of composite plies 146, 186 can be cured. The curing can include additional curing for any of the set of composite plies 146, 186 that were cured at 303.

FIG. 7 is a variation of the schematic cross-section of FIG. 4 illustrating an interior of a composite airfoil 410. The composite airfoil 410 is similar to the composite airfoil 110 (FIG. 4), therefore, like parts of the composite airfoil 410 will be identified with like numerals increased by 300, with it being understood that the description of the like parts of the composite airfoil 110 applies to the composite airfoil 410, except where noted.

The composite airfoil 410 includes at least one airfoil body element, which is illustrated, by way of example, as a set of airfoil body elements that includes a first airfoil body element 445 and a second airfoil body element 447. As illustrated, by way of example, the first airfoil body element 445 abuts the second airfoil body element 447 within the thickness of the composite airfoil 410. It is contemplated, in a different and non-limiting example, that the second airfoil body element 447 can be spaced from the first airfoil body element 445 in any dimension. It is further contemplated in yet another different and non-limiting example, that one or more portions of the second airfoil body element 447 overlap one or more portions of the first airfoil body element 445.

The first airfoil body element 445 includes a set of composite plies 446 that define a plies core 442, and a composite wrap 444. The set of composite plies 446 can include, for example, five plies 449a, 449b, 449c, 449d, 449e. However, any number of layers or ply pieces are contemplated to define the plies core 442. The five plies 449a, 449b, 449c, 449d, 449e include first distal ends 451a, 451b, 451c, 451d, 451e and second distal ends 453a, 453b, 453c, 453d, 453e. Each ply of the set of composite plies 446 can include fibers having a different fiber direction than an adjacent ply of the set of composite plies 446. It is contemplated that if two plies are in contact with one another, one ply has fibers at non-zero angles to the fibers of the other ply. It is further contemplated that adjacent plies can have different weave patterns.

From the five plies 449a, 449b, 449c, 449d, 449e, a pressure ply 449e located closest to the pressure side 432 defines or confronts a pressure surface 452. A suction ply 449a closest to the suction side 134 defines or confronts a suction surface 454. The first distal ends 451a, 451b, 451c, 451d, 451e can be located at an aft end 458 proximate a trailing edge 426 of the composite airfoil 410. The second distal ends 453a, 453b, 453c, 453d, 453e can be located at a fore end 456 proximate a leading edge 424 of the composite airfoil 410.

A set of plies thickness 455 of the set of composite plies 446 is measured from the pressure ply 449e to the suction ply 449a. That is, the set of plies thickness 455 is the thickness of the plies core 442. For example, the set of plies thickness 455 can be measured from the pressure surface 452 to the suction surface 454, generally perpendicular to the chordwise direction (CHd). The set of plies thickness 455 can vary in at least the chordwise direction (CHd). The set of plies thickness 455 is in a range of 1%-100% of an airfoil thickness 457 measured from the pressure side 432 to a suction side 434, when the set of plies thickness 455 is measured adjacent the airfoil thickness 457. As used herein, measuring the set of plies thickness 455 "adjacent" the airfoil thickness 457 means that the set of plies thickness 455 and airfoil thickness 457 are measured within 5% or less of the airfoil chordwise length 450 from each other. It is contemplated that the set of plies thickness 455 is in a range of 10%-50% of the airfoil thickness 457 when the set of plies thickness 455 is measured adjacent the airfoil thickness 457.

The composite wrap 444, by way of example, extends from the suction surface 454, over the aft end 458, to the pressure surface 452. The composite wrap 444 extends the entire length of the pressure surface 452 and over the fore end 456, and again to the suction surface 454. That is, the composite wrap 444 wraps around the aft end 458 and the fore end 456, while extending the length of the pressure surface 452.

While illustrated as in contact with both the first distal ends 451a, 451b, 451c, 451d, 451e and the second distal ends 453a, 453b, 453c, 453d, 453e, it is contemplated that the composite wrap 444 can be in contact with a subset of the first distal ends 451a, 451b, 451c, 451d, 451e, a subset of the second distal ends 453a, 453b, 453c, 453d, 453e, or both.

In other words, the composite wrap 444 can include a first portion 460 in contact with the pressure surface 452, second portions 464 in contact with the suction surface 454, and end portions 468 in contact with a peripheral edge 421 of the composite airfoil 410, illustrated by way of example as both the fore end 456 and the aft end 458.

The second airfoil body element 447 includes a set of composite plies 486 and a composite wrap 484, where the set of composite plies 486 define a plies core 482.

A pressure ply 462 located closest to the pressure side 132 defines a pressure surface 463. A suction ply 470 closest to the suction side 134 defines a suction surface 471.

A set of plies thickness 465 of the set of composite plies 486 is measured from the pressure ply 462 to the suction ply 470. For example, the set of plies thickness 465 can be measured from the pressure surface 463 to the suction surface 471, generally perpendicular to the chordwise direction (CHd). The set of plies thickness 465 can vary in at least the chordwise direction (CHd). The set of plies thickness 465 within the composite wrap 484 is in a range from 1% to 100% of the airfoil thickness 457 when the set of plies thickness 465 is measured adjacent the airfoil thickness 457. For example, the set of plies thickness 465 is in a range from 5% to 60%, 5% to 50%, 5% to 40%, 10% to 60%, 10% to 50%, 10% to 40%, 15% to 60%, 15% to 50%, or 15% to 40% of the airfoil thickness 457 when the set of plies thickness 465 is measured adjacent the airfoil thickness 457.

The composite wrap 484, by way of example, extends from the suction surface 471, over an aft end 473, onto the pressure surface 463.

Optionally, an adhesive 475 can be located between one or more portions of the composite wrap 484 and one or more portions of the set of composite plies 486. The adhesive 475 can couple the composite wrap 484 to the set of composite plies 486.

Figure 8:
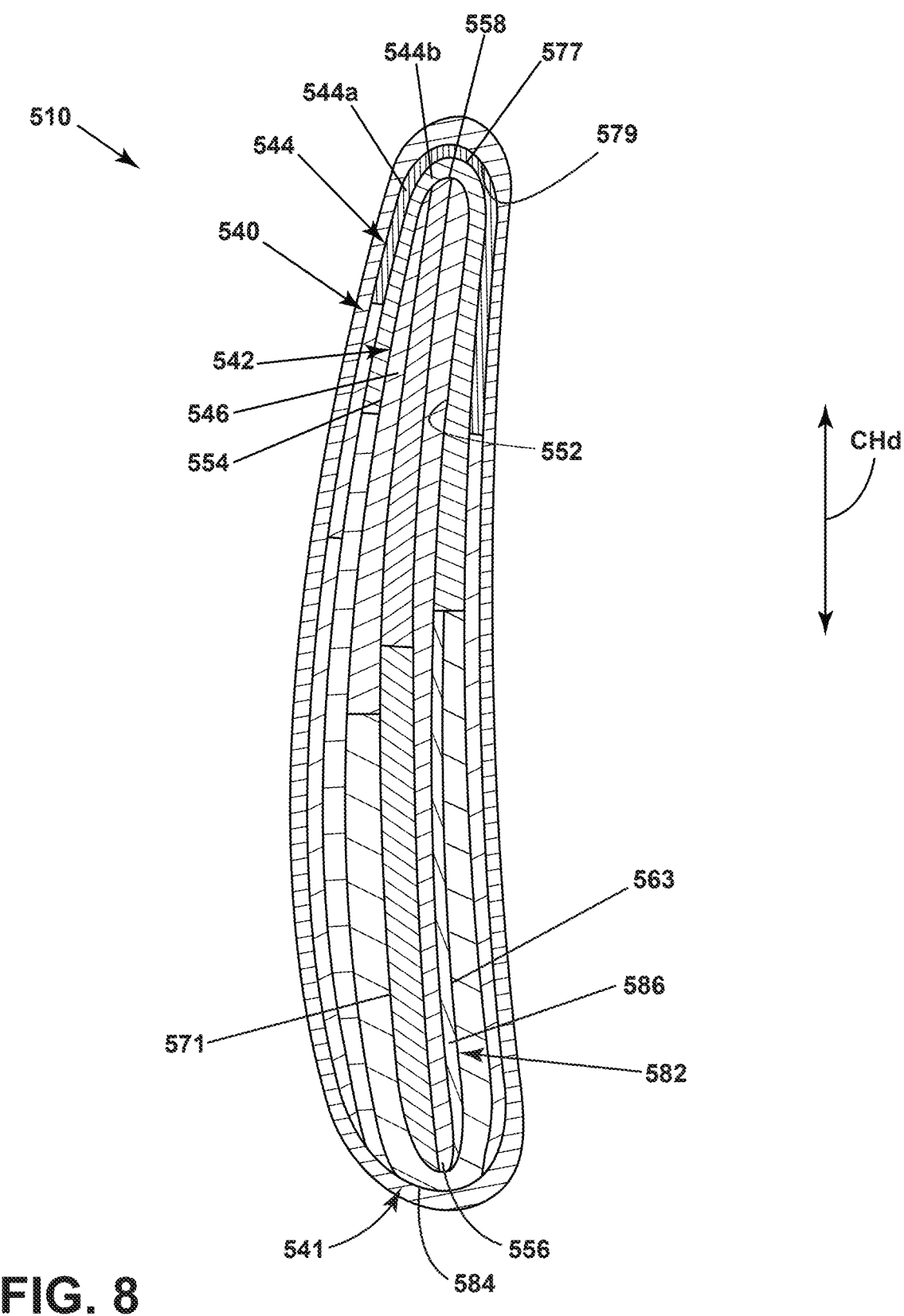
FIG. 8 is another variation of the schematic cross-sectional view of FIG. 4, in accordance with an exemplary embodiment of the present disclosure.

FIG. 8 is a variation of the schematic cross-section of FIG. 4 illustrating an interior of a composite airfoil 510. The composite airfoil 510 is similar to the composite airfoil 110 (FIG. 4), therefore, like parts of the composite airfoil 510 will be identified with like numerals increased by 400, with it being understood that the description of the like parts of the composite airfoil 110 applies to the composite airfoil 510, except where noted.

The at least one airfoil body element is illustrated, by way of example, as a set of airfoil body elements that includes a first airfoil body element 540 and a second airfoil body element 541. As illustrated, by way of example, a portion of the first airfoil body element 540 overlaps a portion of the second airfoil body element 541, although any configuration is contemplated.

The first airfoil body element 540 includes a set of composite plies 546 and a composite wrap 544, where the set of composite plies 546 define a plies core 542. The set of composite plies 546 define a pressure surface 552 and a suction surface 554.

The composite wrap 544, by way of example, is a set of discrete composite wraps illustrated as a first composite wrap 544a and a second composite wrap 544b. The first composite wrap 544a can abut the second composite wrap 544b at inner surfaces 577, 579.

The second airfoil body element 541 includes a set of composite plies 586 and a composite wrap 584, where the set of composite plies 586 define a plies core 582. The set of composite plies 586 define a pressure surface 563 to a suction surface 571.

The composite wrap 584 extends from the suction surface 571, about a fore end 556, to the pressure surface 563. The composite wrap 584, by way of example, extends along the pressure surface 563 in the chordwise direction (CHd) towards an aft end 558 such that a portion of the composite wrap 584 overlaps a portion of the second composite wrap 544b of the first airfoil body element 540.

Figure 9:
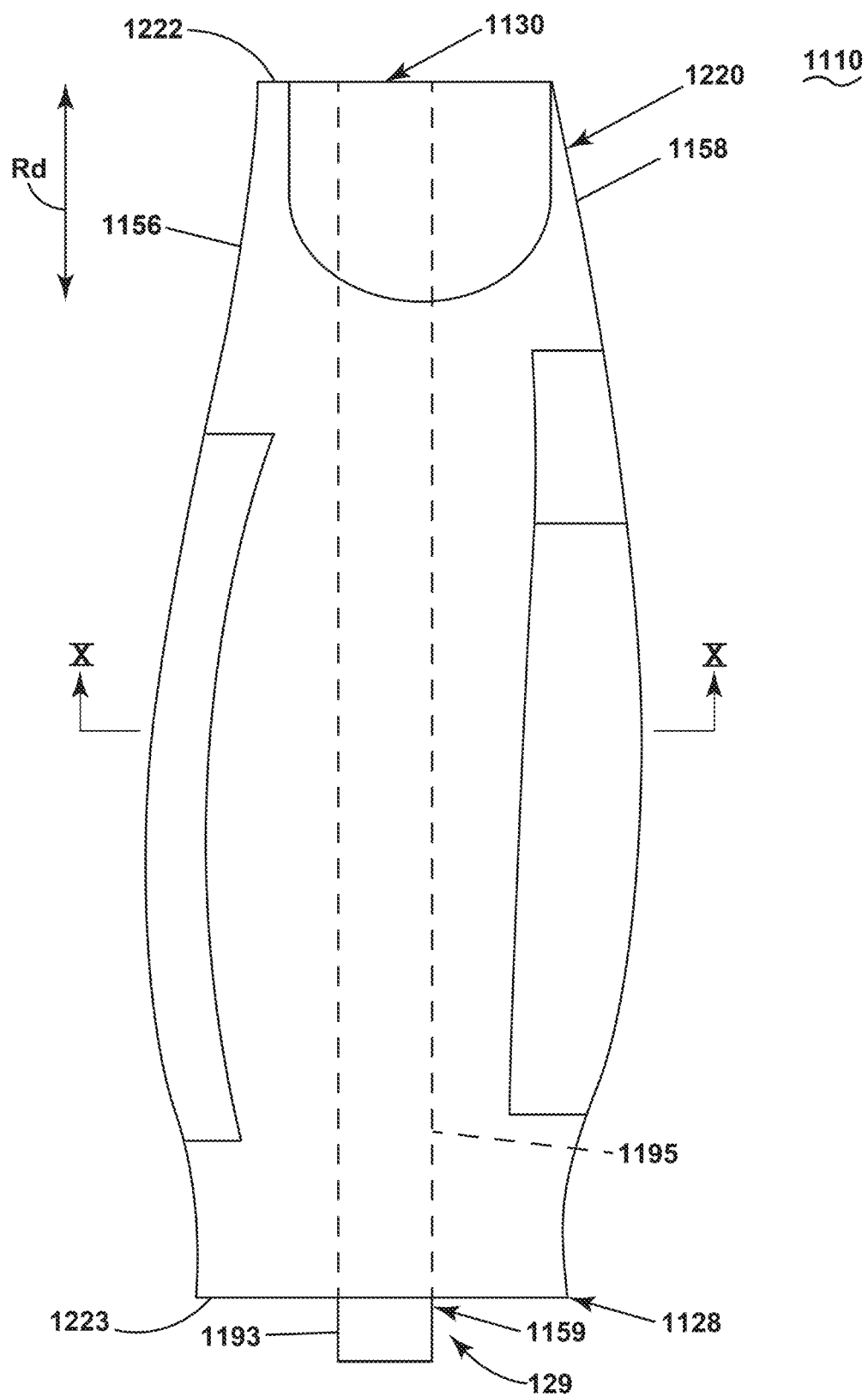
FIG. 9 is a variation of the side view of the composite airfoil of FIG. 5 illustrating a spar core in accordance with an exemplary embodiment of the present disclosure.

FIG. 9 is a variation of FIG. 5 illustrating a side view of a composite airfoil 1110 with the cladding 120 (FIG. 3) removed for ease of understanding.

The composite airfoil 1110 is similar to the composite airfoil 110 (FIG. 4 and FIG. 5), therefore, like parts of the composite airfoil 1110 will be identified with like numerals increased by 1000, with it being understood that the description of the like parts of the composite airfoil 110 applies to the composite airfoil 1110, except where noted.

A peripheral edge 1220 of the composite airfoil 1110 is defined by a fore end 1156, an aft end 1158, a tip end 1222 proximate a tip 1130, and a root end 1223 proximate a root 1128.

The composite airfoil 1110 includes the mounting mechanism 129 that replaces the dove tail portion 138 (FIG. 3 and FIG. 5). The mounting mechanism 129 is illustrated as including a spar 1159. The spar 1159 is illustrated, for example, as having a metal portion 1193 and a composite portion 1195, however the spar 1159 can be a metal spar or a composite spar.

By way of non-limiting example, the metal portion 1193 of the spar 1159 is a metallic base extending into the composite airfoil 1110 past the root 1128. The metal portion 1193 can receive the composite portion 1195 of the spar 1159, where the composite portion 1195 extends in the radial direction (Rd) from the metal portion 1193 towards the tip 1130. While illustrated as transitioning within the composite airfoil 1110, it is contemplated that the transition from the metal portion 1193 to the composite potion 1195 can occur at the root 1128 or otherwise exterior of the composite airfoil 1110.

Figure 10:
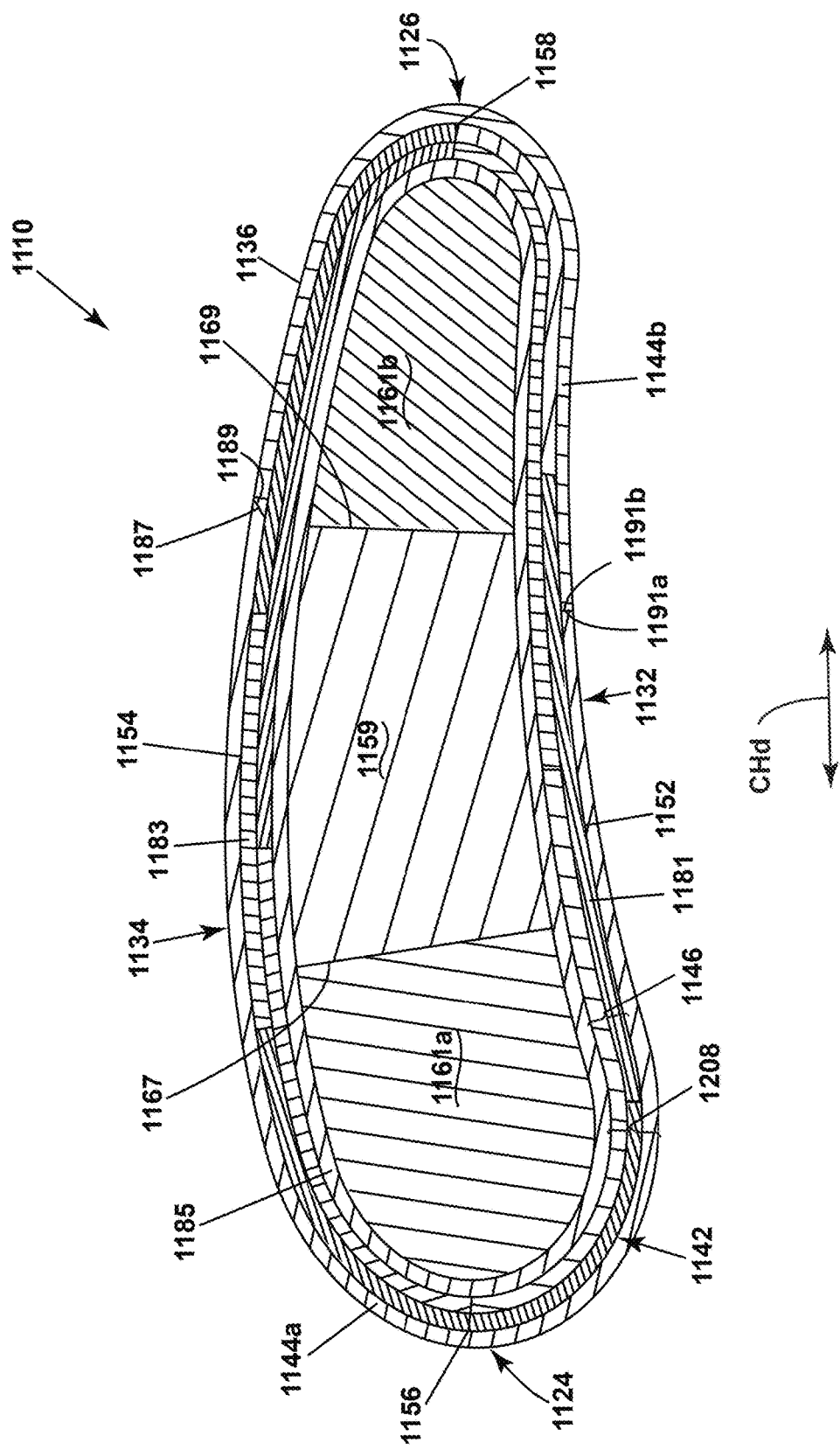
FIG. 10 is a schematic cross-sectional view taken along line X-X of FIG. 9, in which the composite airfoil includes the spar core in accordance with an exemplary embodiment of the present disclosure.

FIG. 10 is a schematic cross-sectional view taken along line X-X of FIG. 9 showing an interior of the composite airfoil 1110, where the composite airfoil 1110 includes a spar core 1142.

The composite airfoil 1110 includes an airfoil outer surface 1136 defining a pressure side 1132 and a suction side 1134, opposing the pressure side 1132. The pressure side 1132 and the suction side 1134 extend between a leading edge 1124 and a trailing edge 1126 in a chordwise direction (CHd).

The composite airfoil 1110 includes the spar core 1142 and a composite wrap illustrated as a first composite wrap 1144a and a second composite wrap 1144b. The spar core 1142 includes the spar 1159, at least one support body illustrated as a first support body 1161a and a second support body 1161b, and a set of polymer matrix composite plies 1146. The set of polymer matrix composite plies 1146 overlie the spar 1159, the first support body 1161a, the second support body 1161b, or any combination thereof.

The spar 1159 has a spar leading edge 1167 facing the leading edge 1124 of the composite airfoil 1110 and a spar trailing edge 1169 facing the trailing edge 1126 of the composite airfoil 1110. The first support body 1161a couples to the spar leading edge 1167 and the second support body 1161b couples to the spar trailing edge 1169. Optionally, the first support body 1161a, the second support body 1161b, or both can couple to the composite portion 1195 (FIG. 9) of the spar 1159.

The least one support body illustrated as the first support body 1161a and the second support body 1161b can include foam. It is contemplated that the first support body 1161a, the second support body 1161b, or both can, additionally or alternatively, include one or more of titanium, aluminum, fiberglass, polyurethane, thermoplastic, or honeycomb structure.

The spar core 1142 includes a pressure surface 1152 facing the pressure side 1132 of the composite airfoil 1110 and a suction surface 1154 facing the suction side 1134 of the composite airfoil 1110. The pressure surface 1152 and suction surface 1154 extend between the fore end 1156, proximate the leading edge 1124 of the composite airfoil 1110, and the aft end 1158, proximate the trailing edge 1126. The pressure surface 1152, the suction surface 1154, or both can be defined by one or more plies of the set of polymer matrix composite plies 1146. It is contemplated that the first support body 1161a, the second support body 1161b, the spar 1159, or any combination thereof can define a portion of the pressure surface 1152, the suction surface 1154, or both.

The set of polymer matrix composite plies 1146 can include a first ply 1181 facing the pressure surface 1152 and a second ply 1183 facing the suction surface 1154. The first composite wrap 1144a overlies the first ply 1181 and extends, for example, over the fore end 1156 to overlie the second ply 1183. That is, the first composite wrap 1144a can wrap around the fore end 1156 and overlie at least a portion of the pressure surface 1152 and at least a portion of the suction surface 1154. In other words, the first composite wrap 1144a can define a portion of the leading edge 1124 of the composite airfoil 1110.

The second composite wrap 1144b overlies the first ply 1181 and extends, for example, over the aft end 1158 to overlie the second ply 1183. That is, the second composite wrap 1144b can wrap around the aft end 1158 and overlie at least a portion of the pressure surface 1152 and at least a portion of the suction surface 1154. In other words, the second composite wrap 1144b can define a portion of the trailing edge 1126 of the composite airfoil 1110.

The first composite wrap 1144a and the second composite wrap 1144b can include end surfaces 1191a, 1191b. The first composite wrap 1144a and the second composite wrap 1144b can abut each other at the end surfaces 1191a, 1191b.

Additionally, or alternatively, the first composite wrap 1144a can have a first end 1187 and the second composite wrap 1144b have a second end 1189. The first end 1187 and second end 1189 can overlap. While illustrated as the first end 1187 extending over the second end 1189, it is contemplated that second end 1189 can extend over the first end 1187.

While illustrated as the first composite wrap 1144a wrapping around the fore end 1156 and the second composite wrap 1144b wrapping around the aft end 1158, either of the first or the second composite wraps 1144a, 1144b can wrap around both the fore end 1156 and the aft end 1158, or any one or more portions of the peripheral edge 1220 (FIG. 9).

The first composite wrap 1144*a*, the second composite wrap 1144*b*, and the set of polymer matrix composite plies 1146 can define a skin 1208. An exterior portion of the skin 1208 can define the airfoil outer surface 1136 of the composite airfoil 1110. The skin 1208 can include a polymer resin and one or more of glass fibers, silicate glass fibers (e.g., aluminosilicates), carbon fibers, or aramid fibers. Additionally, or alternatively, the first composite wrap 1144*a*, the second composite wrap 1144*b*, or the set of polymer matrix composite plies 1146 can include a polymer resin and one or more of glass fibers, carbon fibers, or aramid fibers.

An adhesive 1185 is illustrated between the skin 1208 and the first support body 1161*a*, the second support body 1161*b*, and the spar 1159, although the adhesive 1185 can be located between any two portions of the composite airfoil 1110.

Figure 11:
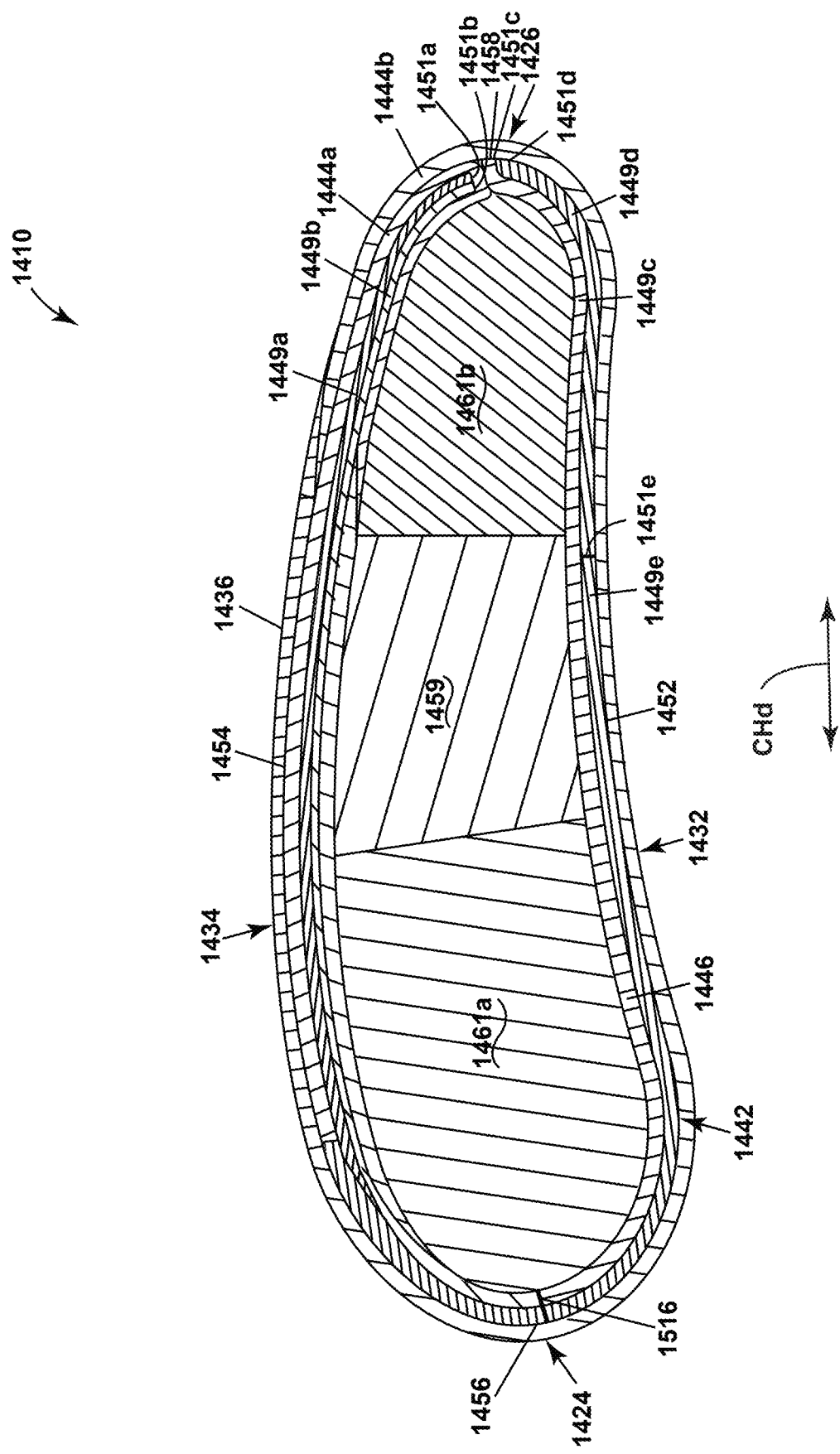
FIG. 11 is a variation of the schematic cross-sectional view of FIG. 10 in accordance with an exemplary embodiment of the present disclosure.

FIG. 11 is a variation of the schematic cross-sectional view of FIG. 10 showing an interior of a composite airfoil 1410, where the composite airfoil includes a spar core 1442. The composite airfoil 1410 is similar to the composite airfoil 410 (FIG. 7) and the composite airfoil 1110 (FIGS. 9 and 10), therefore, like parts of the composite airfoil 1410 will be identified with like numerals similar to composite airfoil 410 (FIG. 7) and the composite airfoil 1110 (FIGS. 9 and 10), increased by 1000 from the composite airfoil 410 (FIG. 7) with it being understood that the description of the like parts of the composite airfoil 410 and the composite airfoil 1110 applies to the composite airfoil 1410, except where noted.

The composite airfoil 1410 includes an airfoil outer surface 1436 defining a pressure side 1432 and a suction side 1434, opposing the pressure side 1432. The pressure side 1432 and the suction side 1434 extend between a leading edge 1424 and a trailing edge 1426 in a chordwise direction (CHd).

The composite airfoil 1410 includes the spar core 1442 and a composite wrap illustrated as a first composite wrap 1444*a* and a second composite wrap 1444*b*. The spar core 1442, similar to the spar core 1142 (FIG. 9), includes a spar 1459, at least one support body illustrated as a first support body 1461*a* and a second support body 1461*b*, and a set of polymer matrix composite plies 1446. The set of polymer matrix composite plies 1446 can overlie the spar 1459, the first support body 1461*a*, the second support body 1461*b*, or any combination thereof. The set of polymer matrix composite plies 1446 can define at least part of a pressure surface 1452 facing the pressure side 1432 of the composite airfoil 1410 and/or a suction surface 1454 facing the suction side 1434 of the composite airfoil 1410.

The set of composite plies 1446 can include, for example, five plies 1449*a*, 1449*b*, 1449*c*, 1449*d*, 1449*e*. However, any number of layers or ply pieces are contemplated. The five plies 1449*a*, 1449*b*, 1449*c* include distal ends 1451*a*, 1451*b*, 1451*c*, 1451*d*, 1451*e*, respectively.

The first composite wrap 1444*a*, by way of example, extends from the first ply 1449*a* facing the pressure surface 1452, over the first distal end 1451*a* and the second distal end 1451*b* of the second ply 1449*b*, to the second ply 1449*b* facing the suction surface 1454. That is, the first composite wrap 1444*a* wraps around the first ply 1449*a*, the second ply 1449*b*, and is in contact with the first distal end 1451*a* and the second distal end 1451*b*.

The second composite wrap 1444*b* extends the entire length of the pressure surface 1452 and over a fore end 1456 of the composite airfoil 1410, and again to the suction surface 1454. That is, the composite wrap 1444 wraps around an aft end 1458 of the composite airfoil 1410 and the fore end 1456, while extending the length of the pressure surface 1452. In other words, the second composite wrap 1444*b* overlies the pressure surface 1452, the fore end 1456, the aft end 1458, and at least a portion of the suction surface 1454.

The second composite wrap 1444*b* at least partially overlies the first composite wrap 1444*a*. While illustrated as in contact, the first composite wrap 1444*a* can be spaced from the second composite wrap 1444*b*, such as by any number of plies.

While illustrated as being in contact with the third distal end 1451*c* and the fourth distal end 1451*d*, it is contemplated that the second composite wrap 1444*b* can be in contact with any number of distal ends.

Figure 12:
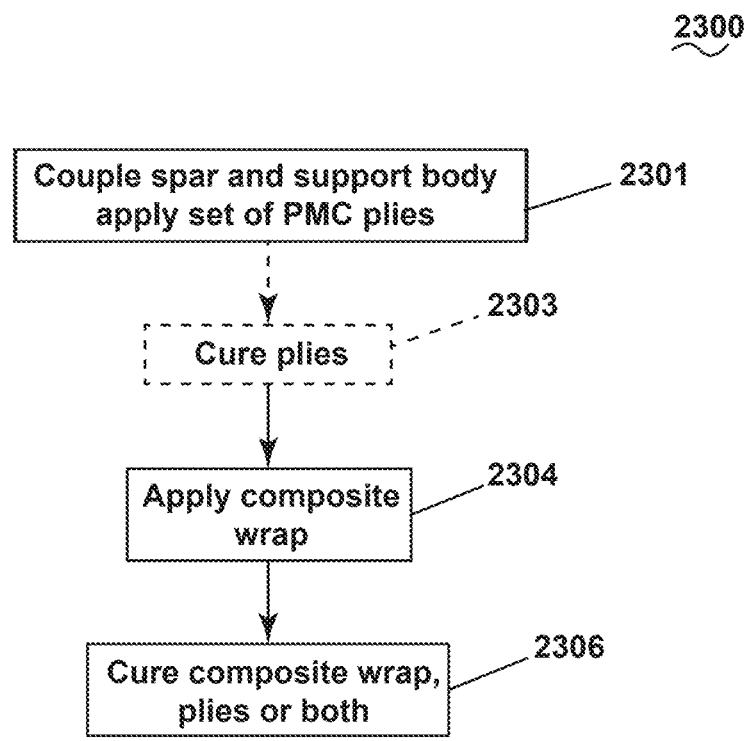
FIG. 12 is a flow chart illustrating a method of manufacturing the composite airfoil having a spar core, in accordance with an exemplary embodiment of the present disclosure.

FIG. 12 illustrates a method 2300 of manufacturing a composite airfoil for a turbine engine 10 (FIG. 1), such as the composite airfoil 1110, 1410 (FIG. 10, FIG. 11). The method 2300 is similar to the method 300 (FIG. 6), therefore, like parts of the method 2300 will be identified with like numerals increased by 2000, with it being understood that the description of the like parts of the method 300 applies to the method 2300, except where noted.

Referring to FIG. 9-FIG. 12, the method 2000 includes at 2301 coupling the at least one support body to the spar 1159, 1459. The at least one support body is illustrated as the first support body 1161*a*, 1461*a* and the second support body 1161*b*, 1461*b*, where the first support body 1161*a*, 1461*a* couples to the spar leading edge 1167 and the second support body 1161*b*, 1461*b* couples to the spar trailing edge 1169. Further, at 2301, the set of polymer matrix composite plies 1146, 1446 are applied to portions of the exterior of the first support body 1161*a*, 1461*a*, the second support body 1161*b*, the spar 1159, 1459, or any combination thereof.

Optionally, at 2303, the set of polymer matrix composite plies 1146, 1446 can be cured.

At 2304, the composite wrap 1144*a*, 1144*b*, 1444*a*, 1444*b* is applied to the set of polymer matrix composite plies 1146, 1446. The composite wrap 1144*a*, 1144*b*, 1444*a*, 1444*b* can overlie portions of the pressure surface 1152, 1452, a peripheral edge 220 (FIG. 5), and a suction surface 1154, 1454 of the spar core 1142, 1442. By way of non-limiting example, the first composite wrap 1444*a* can be applied to the set of polymer matrix composite plies 1446 during the forming of the spar core 1442 at 2301. When applied, the composite wrap 1144*a*, 1144*b*, 1444*a*, 1444*b* can be in contact with any number of distal ends of the set of polymer matrix composite plies 1146, 1446. Optionally, the adhesive 1185 can be applied to one or more of the set of polymer matrix composite plies 1146, 1446, the first or second composite wrap 1144*a*, 1144*b*, 1444*a*, 1444*b*, the spar 1159, 1459, the first support body 1161*a*, 1461*a*, the second support body 1161*b*, 1461*b*, or any combination thereof.

At 2306, the composite wrap 1144*a*, 1144*b*, 1444*a*, 1444*b*, the set of polymer matrix composite plies 1146, 1446, or any combination thereof can be cured. The curing can include additional curing for any of the set of polymer matrix composite plies 1146, 1446 that were cured at 2303.

The set of polymer matrix composite plies 1146, 1446 provide a weight benefit of at least 20%-30% over traditional metal components. PMCs are selected in certain environments over CMCs because PMCs have a higher strength and resistance to mechanical loads. The mechanical loads experienced by the PMC component can include, but are not limited to, linear forces (e.g. impact), rotational forces (e.g., torque while spinning during operation), or any combinations thereof. CMC plies often utilize additional material or reinforcement to achieve the fracture toughness of PMC plies. While CMCs have superior heat resistance to PMCs, in an environment in which mechanical load is a higher priority than heat resistance, PMCs provide an advantage over CMCs. Further, PMC components are less expensive and often easier to fabricate than making the same component from CMC or MMC.

Benefits associated with the composite wrap include increased strength in at least three planes of the composite airfoil. The at least one airfoil body element or the composite wrap increases strength through the thickness of a set of plies. That is, the strength of the composite airfoil in the direction of the thickness of the composite airfoil is improved. The improved strength through the thickness is provided by the composite wrap which partially extends in the direction of the thickness. That is, the composite wrap includes a portion of the wrap that is in a plane parallel to one or more portions of the leading edge, the trailing edge, the tip, or any combination thereof.

Improved strength through the thickness reduces, distributes, or both, stresses or forces caused, for example, by an impact event.

To the extent not already described, the different features and structures of the various embodiments can be used in combination, or in substitution with each other as desired. That one feature is not illustrated in all of the embodiments is not meant to be construed that it cannot be so illustrated but is done for brevity of description. Thus, the various features of the different embodiments can be mixed and matched as desired to form new embodiments, whether or not the new embodiments are expressly described. All combinations or permutations of features described herein are covered by this disclosure.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims. Dimensions and ranges can be interchangeable between the embodiments. For example, various aspects such as, but not limited to, dimensions of FIG. 5 or FIG. 7 can apply to FIG. 10 or FIG. 11.

Further aspects are provided by the subject matter of the following clauses:

A composite airfoil for a turbine engine, the composite airfoil having an airfoil outer surface defining a pressure side and a suction side, opposing the pressure side, which extend between a leading edge and a trailing edge in a chordwise direction, and from a root to a tip in a radial direction, the composite airfoil comprising at least one airfoil body element comprising a plies core comprising a set of composite plies defining a pressure surface facing the pressure side, and a suction surface facing the suction side, with the pressure surface and suction surface extending between a fore end, proximate the leading edge, and an aft end, proximate the trailing edge, wherein at least the fore end, the aft end, and a tip end, proximate the tip, define a peripheral edge of the composite airfoil, and a composite wrap overlying at least a portion of the plies core, wherein the composite wrap is in contact with and extends from the pressure surface, over the peripheral edge, and to the suction surface.

A composite airfoil for a turbine engine, the composite airfoil having an airfoil outer surface defining a pressure side and a suction side, opposing the pressure side, which extend between a leading edge and a trailing edge in a chordwise direction, and from a root to a tip in a radial direction, the composite airfoil comprising at least one airfoil body element comprising a set of composite plies defining a pressure surface facing the pressure side, and a suction surface facing the suction side, with the pressure surface and the suction surface extending between a fore end, proximate the leading edge, and an aft end, proximate the trailing edge, wherein the fore end, the aft end, and a tip end, proximate the tip, define a peripheral edge of the composite airfoil, and a composite wrap overlying at least a portion of the plies core, wherein the composite wrap is in contact with and extends from the pressure surface, over the peripheral edge, and to the suction surface.

A composite airfoil for a turbine engine, the composite airfoil having an airfoil outer surface defining a pressure side and a suction side, opposing the pressure side, which extend between a leading edge and a trailing edge in a chordwise direction, and from a root to a tip in a radial direction, the composite airfoil comprising a spar core having a pressure surface facing the pressure side, a suction surface facing the suction side, with the pressure surface and suction surface extending between a fore end, proximate the leading edge, and an aft end, proximate the trailing edge, wherein at least the fore end, the aft end, and a tip end, proximate the tip, define a peripheral edge of the composite airfoil, the spar core comprising a spar, a support body in contact with the spar, and a set of polymer matrix composite plies including a first ply facing the pressure surface having a first distal end, and a second ply facing the suction surface having a second distal end, and a composite wrap overlying the first ply, extending over the peripheral edge or over the first and second distal ends, and overlying the second ply, wherein the composite wrap is a polymer matrix composite wrap.

The composite airfoil of any preceding clause, wherein the composite wrap includes a first portion in contact with the pressure surface, a second portion in contact with the suction surface, and an end portion in contact with the peripheral edge, wherein the first portion of the composite wrap extends a first chordwise distance in the chordwise direction, and wherein the first chordwise distance is in a range of 2%-100% of an airfoil chordwise length measured from the leading edge to the trailing edge.

The composite airfoil of any preceding clause, wherein the first chordwise distance is in a range of 10%-30% of the airfoil chordwise length measured from the leading edge to the trailing edge.

The composite airfoil of any preceding clause, wherein the composite wrap includes a first portion in contact with the pressure surface, a second portion in contact with the suction surface, and an end portion in contact with the peripheral edge, wherein the first portion of the composite wrap extends a first chordwise distance in the chordwise direction and the second portion of the composite wrap extends a second chordwise distance in the chordwise direction, wherein the first chordwise distance is in a range of 2%-100% of the second chordwise distance.

The composite airfoil of any preceding clause, wherein the composite wrap extends along the peripheral edge a radial distance in the radial direction, wherein the radial distance is in a range of 2%-100% of an airfoil radial length measured from the root to the tip.

The composite airfoil of any preceding clause, wherein the radial distance is in a range of 20%-60% of the airfoil radial length.

The composite airfoil of any preceding clause, wherein the at least one airfoil body element is a set of airfoil body elements having at least a first airfoil body element and a second airfoil body element.

The composite airfoil of any preceding clause, wherein adjacent airfoil body elements of the set of airfoil body elements partially overlap, abut, or are spaced in the radial direction.

The composite airfoil of any preceding clause, wherein adjacent airfoil body elements of the set of airfoil body elements partially overlap, abut, or are spaced in the chordwise direction.

The composite airfoil of any preceding clause, wherein the set of composite plies include a pressure ply confronting the pressure surface and a suction ply confronting the suction surface, wherein a set of plies thickness is measured from the pressure ply to the suction ply.

The composite airfoil of any preceding clause, wherein the set of plies thickness is in a range of 1%-50% of an airfoil thickness measured from the pressure side to the suction side.

The composite airfoil of any preceding clause, wherein a total pressure wrap distance is determined by summing first chordwise distances of the set of composite plies, wherein the total pressure wrap distance can be in a range of 2%-100% of an airfoil chordwise length measured from the leading edge to the trailing edge.

The composite airfoil of any preceding clause, wherein a total suction wrap distance is determined by summing second chordwise distances of the set of composite plies, wherein the total suction wrap distance can be in a range of 10%-40% of the airfoil chordwise length.

The composite airfoil of any preceding clause, wherein the outer surface is defined by a skin that overlies at least a portion of the composite wrap.

The composite airfoil of any preceding clause, wherein each ply of the set of composite plies includes fibers having a different fiber direction than an adjacent ply of the set of composite plies.

The composite airfoil of any preceding clause, wherein the composite wrap includes one or more of glass fibers, silicate glass fibers (e.g., aluminosilicates), carbon fibers, or aramid fibers.

The composite airfoil of any preceding clause, further comprising adhesive that couples the composite wrap to the set of composite plies.

The composite airfoil of any preceding clause, wherein the composite wrap includes a set of discrete composite wraps abutting at inner surfaces.

The composite airfoil of any preceding clause, wherein the plies core does not include foam.

The composite airfoil of any preceding clause, wherein the set of plies includes at least five plies.

The composite airfoil of any preceding clause, wherein the peripheral edge is further defined by a root end proximate the root.

The composite airfoil of any preceding clause, wherein the plies core consists of the set of composite plies.

The composite airfoil of any preceding clause, wherein the composite wrap and the set of polymer matrix composite plies define a skin.

The composite airfoil of any preceding clause, further comprising adhesive between the skin and at least one of the spar or the support body.

The composite airfoil of any preceding clause, wherein the skin includes a polymer resin and one or more of glass fibers, carbon fibers, or aramid fibers.

The composite airfoil of any preceding clause, wherein the support body includes a first support body coupled to a spar leading edge and a second support body coupled to a spar trailing edge.

The composite airfoil of any preceding clause, wherein the first support body and the second support body comprise foam.

The composite airfoil of any preceding clause, wherein the composite wrap overlies at least a portion of the pressure surface and at least a portion of the suction surface at the aft end of the spar core.

The composite airfoil of any preceding clause, wherein the composite wrap overlies at least a portion of the pressure surface and at least a portion of the suction surface at the fore end of the spar core.

The composite airfoil of any preceding clause, wherein the composite wrap overlies at least a portion of the pressure surface and at least a portion of the suction surface at the tip end of the spar core.

The composite airfoil of any preceding clause, wherein the composite wrap overlies at least a portion of the pressure surface and at least a portion of the suction surface at a root end proximate the root of the spar core.

The composite airfoil of any preceding clause, wherein the composite wrap includes multiple composite wraps having at least a first composite wrap and a second composite wrap.

The composite airfoil of any preceding clause, wherein the first composite wrap defines a portion of the leading edge of the composite airfoil and the second composite wrap defines a portion of the trailing edge of the composite airfoil.

The composite airfoil of any preceding clause, wherein the first composite wrap has a first end and the second composite wrap has a second end, wherein the first end and second end overlap.

The composite airfoil of any preceding clause, wherein the second composite wrap overlies the first composite wrap.

The composite airfoil of any preceding clause, wherein the composite wrap overlies the pressure surface, the fore end, the aft end, and at least a portion of the suction surface.

The composite airfoil of any preceding clause, wherein the composite wrap includes one or more of glass fibers, silicate glass fibers, carbon fibers, or aramid fibers.

The composite airfoil of any preceding clause, wherein the set of polymer matrix composite plies include end portions, wherein the end portions are in contact with the composite wrap.

The composite airfoil of any preceding clause, wherein the turbine engine is an unducted turbine engine and the composite airfoil is a blade of a set of circumferentially spaced fan blades or a vane of a set of stationary fan vanes.

The composite airfoil of any preceding clause, wherein the spar contacts the support body at a portion of the spar that includes composite material.

The composite airfoil of any preceding clause, wherein the composite wrap is a thermoset or thermoplastic.

The composite airfoil of any preceding clause, wherein the first composite wrap and the second composite wrap abut at end surfaces.

The composite airfoil of any preceding clause, wherein the composite wrap overlies at least a portion of the pressure surface and at least a portion of the suction surface at two or more of the aft end, the fore end, the tip end, or the root end of the spar core.

The composite airfoil of any preceding clause, wherein the composite wrap overlies at least a portion of the pressure surface and at least a portion of the suction surface at two or more of the aft end, the fore end, the tip end, or the root end of the spar core.

The composite airfoil of any preceding clause, wherein the composite wrap overlies at least a portion of at least one of the pressure surface at the fore end of the spar core or a portion of the suction surface at the fore end of the spar core.

The composite airfoil of any preceding clause, wherein the spar includes composite and metallic materials.

The composite airfoil of any preceding clause, wherein the composite wrap includes a first portion in contact with the pressure surface, a second portion in contact with the suction surface, and an end portion in contact with the peripheral edge, wherein the first portion of the composite wrap extends a first chordwise distance in the chordwise direction, and wherein the first chordwise distance is in a range of 2%-100% of an airfoil chordwise length measured from the leading edge to the trailing edge.

The composite airfoil of any preceding clause, wherein the first chordwise distance is in a range of 10%-30% of the airfoil chordwise length measured from the leading edge to the trailing edge.

The composite airfoil of any preceding clause, wherein the composite wrap includes a first portion in contact with the pressure surface, a second portion in contact with the suction surface, and an end portion in contact with the peripheral edge, wherein the first portion of the composite wrap extends a first chordwise distance in the chordwise direction, the second portion of the composite wrap extends a second chordwise distance in the chordwise direction, wherein the first chordwise distance, the second chordwise distance, or the first chordwise distance and the second chordwise distance is in a range of 2%-100% of an airfoil chordwise length measured from the leading edge to the trailing edge.

The composite airfoil of any preceding clause, wherein the composite wrap extends along the peripheral edge a radial distance in the radial direction, wherein the radial distance is in a range of 2%-100% of an airfoil radial length measured from the root to the tip.

The composite airfoil of any preceding clause, wherein the radial distance is in a range of 5%-40% of the airfoil radial length.

The composite airfoil of any preceding clause comprising a spar core and a plies core.

A method of manufacturing an airfoil body element for a composite airfoil for a turbine engine, the method comprising stacking multiple plies to form a set of composite plies, applying a composite wrap such that the composite wrap overlays and is in contact with portions of a pressure surface, a peripheral edge, and a suction surface of the set of composite plies, and curing the composite wrap, the set of composite plies, or both the composite wrap and the set of composite plies.

A method of manufacturing a polymer matrix composite airfoil for a turbine engine, the method comprising coupling at least one support body to a spar, applying a set of polymer matrix composite plies to one or more portions of the at least one support body, the spar, or both to define a spar core having a pressure surface, a peripheral edge, and a suction surface, applying a composite wrap that extends from the pressure surface, over the peripheral edge to the suction surface, or wraps around the distal ends of the set of polymer matrix composite plies, and curing the composite wrap, the set of polymer matrix composite plies, or both the composite wrap and the set of polymer matrix composite plies.

The method of any preceding clause, further comprising, prior to applying the composite wrap, curing the set of polymer matrix composite plies.

The method of any preceding clause, further comprising, prior to curing, applying an adhesive to one or more of the set of polymer matrix composite plies, the composite wrap, the spar, a first support body, a second support body, or any combination thereof.

The method of any preceding clause, wherein the stacking multiples plies includes stacking the multiple plies on at least part of a first portion of the composite wrap.

The method of any preceding clause, further comprising, prior to applying the composite wrap, curing the set of composite plies.

The method of any preceding clause, wherein the after applying the composite wrap includes applying an adhesive to one or more of the composite wrap or the cured set of composite plies.

The method of any preceding clause, further comprising applying an adhesive to one or more of the composite wrap or the cured set of composite plies.

What is claimed is:

1. A composite airfoil for a turbine engine, the composite airfoil having an airfoil outer surface defining a pressure side and a suction side, opposing the pressure side, which extend between a leading edge and a trailing edge in a chordwise direction, and from a root to a tip in a radial direction, the composite airfoil comprising:
  at least one airfoil body element comprising:
    a plies core comprising a set of composite plies defining:
      a pressure surface facing the pressure side; and
      a suction surface facing the suction side, with the pressure surface and suction surface extending between a fore end, proximate the leading edge, and an aft end, proximate the trailing edge, and wherein the set of composite plies are contiguous between the pressure surface and the suction surface, and between the fore end and the aft end;
      wherein at least the fore end, the aft end, and a tip end, proximate the tip, define a peripheral edge of the composite airfoil; and
    a composite wrap overlying at least a portion of the plies core, wherein the composite wrap is in contact with and extends from the pressure surface, over the peripheral edge, and to the suction surface.

2. The composite airfoil of claim 1, wherein the composite wrap includes a first portion in contact with the pressure surface, a second portion in contact with the suction surface, and an end portion in contact with the peripheral edge, wherein the first portion of the composite wrap extends a first chordwise distance in the chordwise direction, and wherein the first chordwise distance is in a range of 2%-100% of an airfoil chordwise length measured from the leading edge to the trailing edge.

3. The composite airfoil of claim 2, wherein the first chordwise distance is in a range of 10%-30% of the airfoil chordwise length measured from the leading edge to the trailing edge.

4. The composite airfoil of claim 1, wherein the composite wrap includes a first portion in contact with the pressure surface, a second portion in contact with the suction surface, and an end portion in contact with the peripheral edge, wherein the first portion of the composite wrap extends a first chordwise distance in the chordwise direction and the second portion of the composite wrap extends a second chordwise distance in the chordwise direction, wherein the first chordwise distance is in a range of 2%-100% of the second chordwise distance.

5. The composite airfoil of claim 1, wherein the composite wrap extends along the peripheral edge a radial distance in the radial direction, wherein the radial distance is in a range of 2%-100% of an airfoil radial length measured from the root to the tip.

6. The composite airfoil of claim 5, wherein the radial distance is in a range of 20%-60% of the airfoil radial length.

7. The composite airfoil of claim 1, wherein the at least one airfoil body element is a set of airfoil body elements having at least a first airfoil body element and a second airfoil body element.

8. The composite airfoil of claim 1, wherein the set of composite plies include a pressure ply confronting the pressure surface and a suction ply confronting the suction surface, wherein a set of plies thickness is measured from the pressure ply to the suction ply.

9. The composite airfoil of claim 8, wherein the set of plies thickness is in a range of 1%-50% of an airfoil thickness measured from the pressure side to the suction side.

10. The composite airfoil of claim 8, wherein a total pressure wrap distance is determined by summing first chordwise distances of the set of composite plies, wherein the total pressure wrap distance can be in a range of 2%-100% of an airfoil chordwise length measured from the leading edge to the trailing edge.

11. The composite airfoil of claim 10, wherein a total suction wrap distance is determined by summing second chordwise distances of the set of composite plies, wherein the total suction wrap distance can be in a range of 10%-40% of the airfoil chordwise length.

12. The composite airfoil of claim 1, wherein the airfoil outer surface is defined by a skin that overlies at least a portion of the composite wrap.

13. The composite airfoil of claim 1, wherein each ply of the set of composite plies includes fibers having a different fiber direction than an adjacent ply of the set of composite plies.

14. The composite airfoil of claim 1, wherein the composite wrap includes one or more of glass fibers, silicate glass fibers (e.g., aluminosilicates), carbon fibers, or aramid fibers.

15. The composite airfoil of claim 1, further comprising adhesive that couples the composite wrap to the set of composite plies.

16. The composite airfoil of claim 1, wherein the composite wrap includes a set of discrete composite wraps abutting at inner surfaces.

17. The composite airfoil of claim 1, wherein the set of plies includes at least five plies.

18. A composite airfoil for a turbine engine, the composite airfoil having an airfoil outer surface defining a pressure side and a suction side, opposing the pressure side, which extend between a leading edge and a trailing edge in a chordwise direction, and from a root to a tip in a radial direction, the composite airfoil comprising:
    at least one airfoil body element comprising:
        a plies core comprising a set of composite plies defining:
            a pressure surface facing the pressure side; and
            a suction surface facing the suction side, with the pressure surface and suction surface extending between a fore end, proximate the leading edge, and an aft end, proximate the trailing edge;
            wherein at least the fore end, the aft end, and a tip end, proximate the tip, define a peripheral edge of the composite airfoil;
        a composite wrap overlying at least a portion of the plies core, wherein the composite wrap is in contact with and extends from the pressure surface, over the peripheral edge, and to the suction surface; and
        a skin that overlies and in contact with the composite wrap at a trailing edge surface of the composite wrap.

19. A composite airfoil for a turbine engine, the composite airfoil having an airfoil outer surface defining a pressure side and a suction side, opposing the pressure side, which extend between a leading edge and a trailing edge in a chordwise direction, and from a root to a tip in a radial direction, the composite airfoil comprising:
    at least one airfoil body element comprising:
        a plies core comprising a set of composite plies defining:
            a pressure surface facing the pressure side; and
            a suction surface facing the suction side, with the pressure surface and suction surface extending between a fore end, proximate the leading edge, and an aft end, proximate the trailing edge;
            wherein at least the fore end, the aft end, and a tip end, proximate the tip, define a peripheral edge of the composite airfoil;
        a first composite wrap overlying at least a portion of the plies core, wherein the composite wrap is in contact with and extends from the pressure surface, over the peripheral edge at the aft end, and to the suction surface;
        a second composite wrap overlying at least a portion of the plies core, wherein the composite wrap is in contact with and extends from the pressure surface, over the peripheral edge at the fore end or the tip end, and to the suction surface.

20. The composite airfoil of claim 18, wherein the plies core does not include foam.

* * * * *